(12) United States Patent
Thompson

(10) Patent No.: US 10,892,887 B2
(45) Date of Patent: Jan. 12, 2021

(54) METHOD AND SYSTEM FOR STORING A BINARY LARGE OBJECT

(71) Applicant: North Peak Resources Ltd., Toronto (CA)

(72) Inventor: Thomas Thompson, Monaco (MC)

(73) Assignee: NORTH PEAK RESOURCES LTD., Toronto (CA)

( * ) Notice: Subject to any disclaimer, the term of this patent is extended or adjusted under 35 U.S.C. 154(b) by 0 days.

(21) Appl. No.: 16/732,078

(22) Filed: Dec. 31, 2019

(65) Prior Publication Data

US 2020/0136807 A1 Apr. 30, 2020

Related U.S. Application Data

(63) Continuation of application No. PCT/CA2019/050453, filed on Apr. 12, 2019.

(60) Provisional application No. 62/660,935, filed on Apr. 20, 2018.

(51) Int. Cl.
*H04L 9/06* (2006.01)
*H04L 9/32* (2006.01)
*H04L 29/08* (2006.01)

(52) U.S. Cl.
CPC .......... *H04L 9/0637* (2013.01); *H04L 9/0643* (2013.01); *H04L 9/3236* (2013.01); *H04L 67/1097* (2013.01)

(58) Field of Classification Search
CPC ... H04L 9/0637; H04L 9/0643; H04L 9/3236; H04L 67/1097
USPC ...................................................... 713/189
See application file for complete search history.

(56) References Cited

U.S. PATENT DOCUMENTS

| | | | |
|---|---|---|---|
| 2016/0292672 A1* | 10/2016 | Fay | G06Q 20/36 |
| 2017/0048216 A1 | 2/2017 | Chow et al. | |
| 2017/0163733 A1* | 6/2017 | Grefen | H04L 67/20 |
| 2017/0220815 A1* | 8/2017 | Ansari | G06Q 20/389 |
| 2017/0262862 A1* | 9/2017 | Aljawhari | G06F 16/90335 |
| 2018/0060496 A1 | 3/2018 | Bulleit et al. | |
| 2018/0152289 A1* | 5/2018 | Hunt | G06Q 20/223 |

(Continued)

FOREIGN PATENT DOCUMENTS

WO 2018069566 A1 4/2018

OTHER PUBLICATIONS

Mainelli, Michael, and Mike Smith. "Sharing ledgers for sharing economies: an exploration of mutual distributed ledgers (aka blockchain technology)." Journal of Financial Perspectives 3.3 (2015). (Year: 2015).*

(Continued)

*Primary Examiner* — Syed A Zaidi

(57) ABSTRACT

Methods, systems, and techniques for storing a binary large object involve receiving, at a first node comprising part of a first blockchain, the binary large object; hashing the binary large object; sending the binary large object from the first node to at least one other node that is part of the first blockchain without using the first blockchain; and after the binary large object has been disseminated to at least the number of nodes on the first blockchain required to achieve consensus, storing a hash of the binary large object on the first blockchain. Sending the binary large object involves disseminating the binary large object to at least a number of nodes on the first blockchain required to achieve consensus.

14 Claims, 14 Drawing Sheets

(56) References Cited

U.S. PATENT DOCUMENTS

2019/0340362 A1* 11/2019 Wright .................. H04L 9/0643
2019/0342078 A1* 11/2019 Li ........................ H04L 9/0643

OTHER PUBLICATIONS

Chen, Zhi-dong, et al. "Inter-blockchain communication." DEStech Transactions on Computer Science and Engineering cst (2017). (Year: 2017).*
NPL Search Results (Year: 2020).*
NPL Search Terms (Year: 2020).*
International Search Report and Written Opinion for International Patent Application No. PCT/CA2019/050453, dated Jun. 18, 2019.
Cachin C. et al., Blockchain Consensus Protocols in the Wild, IBM Research—Zurich, Jul. 7, 2017, pp. 1-24.
Popejoy, S., "Confidentiality Private Blockchain," Revision v1.0, Aug. 2016, pp. 1-9.
Martino, W., "The first scalable, high performance private blockchain," Revision v1.0, Aug. 2016, pp. 1-9.
Quaintance, M. et al., "Chainweb Protocol Security Calculations," Work in Progress—Draft v7, Jan. 2018, pp. 1-8.
Martino, W. et al., "Chainweb: A Proof-of-Work Parallel-Chain Architecture for Massive Throughput," Draft v15, Jan. 2018, pp. 1-19.
Martino, W. et al., "The Kadena Public Blockchain Project Summary Whitepaper," Version 1.2, Nov. 2018, pp. 1-7.
Buchman, E., "Tendermint: Byzantine Fault Tolerance in Ages of Blockchains," A Thesis present to the University of Guelph, Jun. 2016.
Kwan, J. et al. "Cosmos a Network of Distributed Ledgers," Aug. 16, 2017, available at: https://github.com/cosmos/cosmos/blob/9bbac9ef80a7f3fd067cab338bcf433ef73fa19/Whitepaper.md.

* cited by examiner

METHOD AND SYSTEM FOR STORING A BINARY LARGE OBJECT

TECHNICAL FIELD

The present disclosure is directed at methods, systems, and techniques for storing a binary large object.

BACKGROUND

A blockchain is a database and/or application execution engine that is distributed on computer nodes and that is inherently resistant to corruption and tampering. While initially used for bitcoin, blockchain has applications that extend significantly beyond bitcoin and the financial services industry generally.

SUMMARY

According to a first aspect, there is provided a method for storing a binary large object, the method comprising: receiving, at a first node comprising part of a first blockchain, the binary large object; hashing the binary large object; sending the binary large object from the first node to at least one other node comprising part of the first blockchain without using the first blockchain, wherein the sending comprises part of disseminating the binary large object to at least a number of nodes on the first blockchain required to achieve consensus; and after the binary large object has been disseminated to at least the number of nodes on the first blockchain required to achieve consensus, storing a hash of the binary large object on the first blockchain.

Storing the hash of the binary large object on the first blockchain may comprise, at each of the at least a number of nodes on the first blockchain required to achieve consensus: receiving a proposed hash of the binary large object; determining a hash of the binary large object that has been disseminated to the node; determining whether the proposed hash is equivalent to the hash of the binary large object that has been disseminated to the node; and only voting to store the proposed hash on the first blockchain if the proposed hash is equivalent to the hash of the binary large object that has been disseminated to the node.

The method may further comprise, at each of the at least a number of nodes on the first blockchain required to achieve consensus: flagging the binary large object that has been disseminated to the node as a temporary file; and when the proposed hash is equivalent to the hash of the binary large object that has been disseminated to the node, flagging the binary large object that has been disseminated to the node as a temporary file as a non-temporary file.

The method may further comprise: receiving, at the first node, a path of the binary large object; and after the binary large object has been disseminated to at least the number of nodes on the first blockchain required to achieve consensus, storing the path of the binary large object on the first blockchain.

The method may further comprise, prior to storing the path on the first blockchain, at each of the at least a number of nodes on the first blockchain required to achieve consensus: receiving a proposed path of the binary large object; determining whether the proposed path is valid; and only voting to store the proposed path on the first blockchain if the proposed path is valid.

The method may further comprise: sending, from the first blockchain to a second blockchain, the hash of the binary large object; storing the hash of the binary large object on the second blockchain; receiving, at a first node comprising part of the first blockchain from a second node comprising part of the second blockchain, the hash of the binary large object without using the first or the second blockchain; after receiving the hash of the binary large object, determining whether the hash of the binary large object has been sent to the second blockchain; and when the hash of the binary large object has been sent to the second blockchain, sending the binary large object to the second node from the first node without using the first or the second blockchain.

Sending, from the first blockchain to the second blockchain, the hash of the binary large object may comprise sending, from the first blockchain to the second blockchain: lineage verification data that permits the second blockchain to verify a lineage of at least one block of the first blockchain; a proper subset of all non-header data stored using the at least one block, wherein the proper subset of all non-header data comprises the hash of the binary large object; and validity verification data that permits the second blockchain to verify validity of the proper subset of all non-header data sent to the second blockchain from the first blockchain.

According to another aspect, there is provided a method for storing a binary large object, the method comprising: receiving, at a second node from a first node, a binary large object, wherein each of the first and second nodes comprise part of a first blockchain and the binary large object is received at the second node without using the first blockchain; after receiving an entirety of the binary large object, determining a hash of the binary large object that was received at the second node from the first node; receiving a proposed hash of the binary large object; determining whether the proposed hash is equivalent to the hash of the binary large object that was received at the second node from the first node; and only voting to store the proposed hash on the first blockchain if the proposed hash is equivalent to the hash of the binary large object that was received at the second node from the first node.

The method may further comprise: flagging the binary large object that has been disseminated to the node as a temporary file; and when the proposed hash is equivalent to the hash of the binary large object that has been disseminated to the node, flagging the binary large object that has been disseminated to the node as a temporary file as a non-temporary file.

The method may further comprise: receiving a proposed path of the binary large object; determining whether the proposed path is valid; and only voting to store the proposed path on the first blockchain if the proposed path is valid.

The method may further comprise: receiving, at a second blockchain comprising the second node from a first blockchain comprising the first node, the hash of the binary large object; storing the hash of the binary large object on the second blockchain; sending, from the second node to the first node, the hash of the binary large object without using the first or the second blockchain; and receiving, from the first node to the second node, the binary large object without using the first or the second blockchain.

Receiving, at the second blockchain from the first blockchain, the hash of the binary large object may comprise: receiving, at the second blockchain from the first blockchain: lineage verification data that permits the existing blockchain to verify a lineage of at least one block of the first blockchain; a proper subset of all non-header data stored using the at least one block, wherein the proper subset of all non-header data comprises the hash of the binary large object; and validity verification data that permits the second blockchain to verify validity of the proper subset of all non-header data sent to the second blockchain from the first blockchain; verifying lineage of the at least one block of the first blockchain using the lineage verification data; verifying validity of the proper subset of all non-header data using the validity verification data; and adding a new block to the second blockchain, wherein the new block is used to store the lineage verification data, the proper subset of all non-header data, and the validity verification data received from the first blockchain.

According to another aspect, there is provided a system for storing a binary large object, the system comprising: network interface hardware for interfacing with another node comprising part of a first blockchain; a data store having stored on it the first blockchain and for storing the binary large object; a processor communicatively coupled to the data store and network interface hardware; and a memory communicatively coupled to the processor and having stored on it computer program code that is executable by the processor and that when executed by the processor causes the processor to perform the method of any of the foregoing aspects and suitable combinations thereof.

According to another aspect, there is provided a non-transitory computer readable medium have stored thereon computer program code that is executable by a processor and that when executed by the processor causes the processor to perform the method of any of the foregoing aspects and suitable combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

Figure 1:
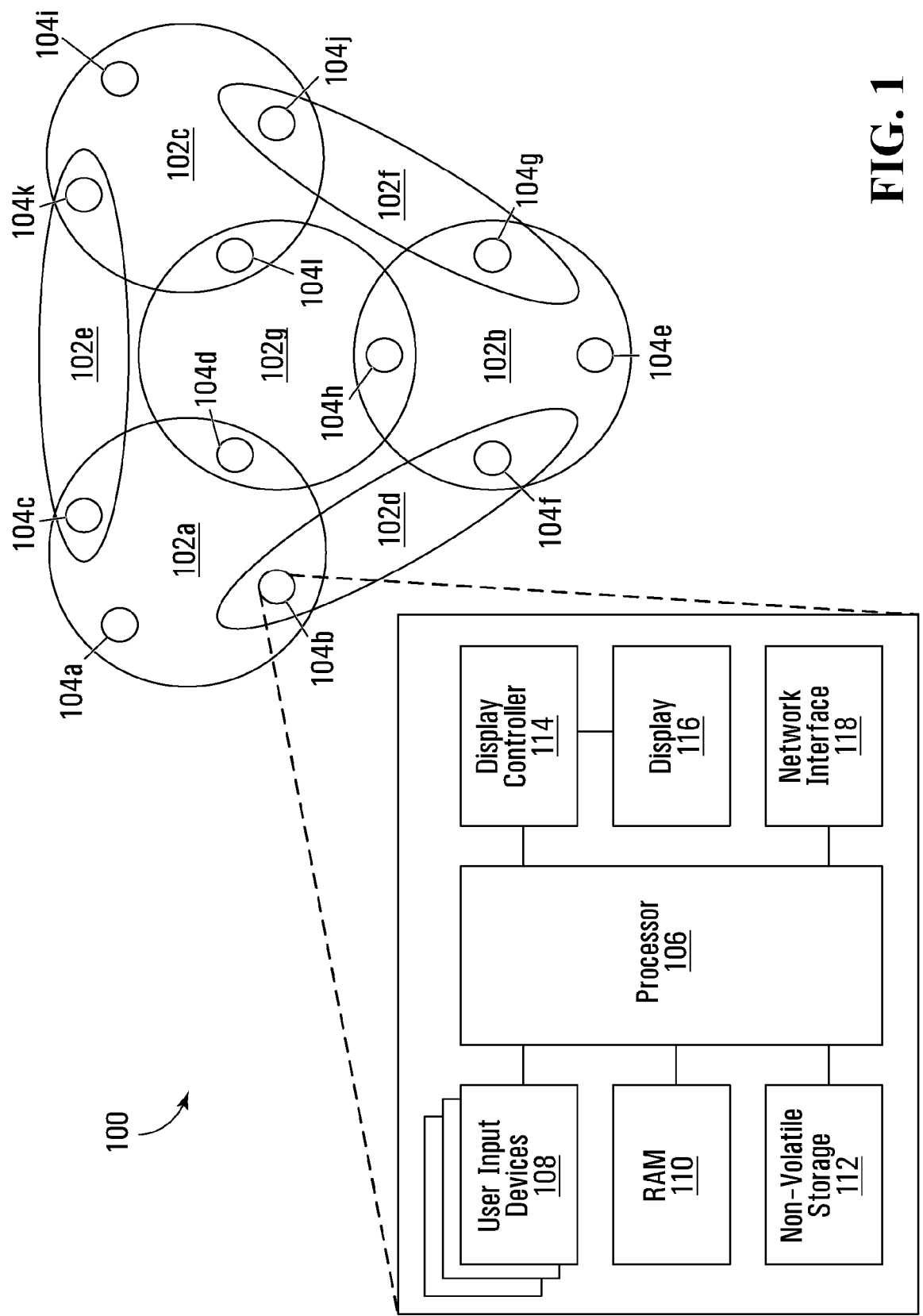
FIG. 1 depicts a system for facilitating data transfer between blockchains, according to one example embodiment.

A blockchain's physical layer comprises computer nodes on which is collectively stored a distributed database. The database is stored as a generally linear chain of "blocks", with each subsequent block in the chain directly linked in a cryptographically secure manner to the immediately preceding block in the chain. New blocks added to the blockchain are referred to as being "higher" in the blockchain than the blocks added to the blockchain prior to it. The first, or lowest, block in the blockchain is referred to as the "genesis block". Because each block in the blockchain is directly linked to its immediately preceding block, any block in the blockchain can, directly or indirectly, be traced back to the genesis block. This is one way in which any one of the nodes can check the validity of the blockchain.

A blockchain can be implemented in a variety of ways. In one example implementation of blockchain used for bitcoin, each block of a blockchain comprises that block's size, in bytes; a block header; a transaction counter, representing the number of different bitcoin transactions stored in that block; and transaction data, which are the stored transactions. In the same example implementation, the block header for each block comprises version information; a previous block hash, which is a reference to the hash of the block immediately preceding that block; a Merkle root, which is a hash of the Merkle tree root of the transactions stored in that block; a timestamp, which is when the block was created; a difficulty target, which is the minimum difficulty that had to be satisfied when performing a proof-of-work operation during block creation; and a nonce, resulting from the proof-of-work.

In a conventional blockchain implementation, different nodes comprising part of the blockchain compete to generate new blocks by performing a proof-of-work operation that satisfies at least the difficulty target specified in each of the new blocks' headers. Once generated, a new block is disseminated to, and its authenticity is independently verified by, other nodes in the blockchain by using the previous block hash (to confirm that new block's lineage) and Merkle root (to confirm the validity of the transactions stored in that new block). Once a new block has been verified, it is added to the top of the blockchain. The blockchain at any given time is typically the chain having blocks resulting from the highest possible cumulative proof-of-work. The nodes are said to have arrived at "consensus" when they agree as to which block is to be added to the top of the blockchain. While the blockchain may fork from time-to-time, resulting in temporarily competing versions of the blockchain, the fact that each block is cryptographically linked to its immediately preceding block means that blocks far from the top of the blockchain are, for practical purposes, immutable.

The distributed and peer-to-peer nature of blockchain described above is also associated with some drawbacks. For example, a byproduct of blockchain's distributed nature is that all nodes comprising part of a blockchain have access to all the data stored on that blockchain, making privacy protection difficult. While certain non-header data on a blockchain may be encrypted, encryption introduces technical overhead and also inhibits what can be done, such as implementing applications as smart contracts, with the data. Furthermore, as a single node scales and is concurrently a node for an increasing number of blockchains, the computational resources required of that node also scale upwards linearly, impeding the ability of that node to efficiently be a member of a high number of blockchains.

The embodiments described herein are described as methods, systems, and techniques to mitigate at least one of the foregoing problems. For example, in at least some of the embodiments described below data may be securely shared between blockchains by a process referred to herein as "chain joining". Using joining, a first blockchain may securely share with a second blockchain a proper subset of non-header data stored on the first blockchain; this is in contrast to being forced to share all of the data stored on the first blockchain, as is required between all the nodes comprising the first blockchain. In at least one of the depicted embodiments herein, the non-header data replaces the transaction data stored on a blockchain when the blockchain is used to implement bitcoin. For example, in at least some of the example embodiments, the non-header data comprises an action that is performed by an application implemented as a smart contract also stored on the blockchain, and data representing the resulting application state that follows from performing that action. Each action in the embodiments depicted herein comprises a JSON object, although in different embodiments an action may comprise a different data structure. Sending, from a first blockchain, the application state data and the action whose performance by the first blockchain results in the application state allows a second blockchain to independently determine whether the state it receives from the first blockchain is accurate.

In at least some example embodiments, the non-header data of a blockchain comprises application data, which is data related to an application stored in the blockchain, such as the applications itself or application state data. For example, in an application configured to store a list of contacts, application state data may comprise a list of those contacts, and a proper subset of application state data may comprise a single entry in that list. In some other example embodiments, the non-header data may not be related to any particular application may comprise a JSON object or binary files.

Furthermore, in at least some of the embodiments described below any one or more nodes may use a hypervisor to virtualize (either fully or using paravirtualization) one or more blockchains while routing system operations through a host controller running on each of those one or more nodes. The host controller may itself be a blockchain ("host blockchain"). The host controller allocates at least some hardware resources of the node on which it runs in response to requests from one or more blockchains running on the hypervisor; each of those chains is referred to interchangeably herein as a "guest blockchain". The host controller performs resource allocation based on, for example, resource availability and task priority. This permits the different blockchains to efficiently share that node's hardware resources, thereby facilitating scaling. Furthermore, in embodiments comprising the host blockchain, the computer program code for at least one of the guest blockchains may be stored in the host blockchain. This permits the host blockchain to store a list of all of those guest blockchains' application state changes, thereby permitting a user to easily to change the state of those applications to any previous state stored in the host blockchain. This may in particular be useful for at least one of debugging and auditing the activities of that node. In embodiments comprising the host blockchain, one or more of the guest blockchains may be stored in the host blockchain, while a different one or more of the guest blockchains may be stored outside of the host blockchain; all guest blockchains may nonetheless have resources allocated for them by the host blockchain, thereby facilitating scalability.

Referring now to FIG. 1, there is shown a system 100 for facilitating data transfer between blockchains, according to one example embodiment. The system 100 comprises first through twelfth nodes 104a-l (generally, "nodes 104"), each of which comprises part of one or more blockchains 102a-g (generally, "blockchains" or "chains" 102). A first blockchain 102a comprises the first through fourth nodes 104a-d; a second blockchain 102b comprises the fifth through eighth nodes 104e-h; and a third blockchain comprises the ninth through twelfth nodes 104i-l.

As discussed in further detail below, the first blockchain 102a is "joined" to a fourth blockchain 102d (via the second node 104b) and to a fifth blockchain 102e (via the third node 104c): this permits all or some of the data stored on the first blockchain 102a to be securely shared with the fourth and fifth blockchains 102d,e, respectively. The second blockchain 102b is analogously joined to the fourth blockchain 102d (via the sixth node 104f) and the sixth blockchain 102f (via the seventh node 104g), and the third blockchain 102c is analogously joined to the sixth blockchain 102f (via the tenth node 104j) and the fifth blockchain 102e (via the eleventh node 104k).

Also as discussed in further detail below, as the fourth blockchain 102d is joined to the first and second blockchains 102a,b, the first and second blockchains 102a,b may read and write data from and to each other via the fourth blockchain 102d. Analogously, the second and third blockchains 102b,c may read and write data from and to each other via the sixth blockchain 102f, and the first and third blockchains 102a,c may read and write data from and to each other via the fifth blockchain 102e. The fourth through sixth blockchains 102d-f are accordingly interchangeably referred to herein as "transfer blockchains" as they facilitate the selective transfer of data between the first through third blockchains 102a-c.

The eighth blockchain 102g in the system 100 is a "directory blockchain" on which is stored data to be freely accessible by the first through third blockchains 102a-c.

While in a conventional bitcoin implementation, generating new blocks comprises applying a proof-of-work, in the depicted embodiments consensus is achieved without applying proof-of-work. For example, the depicted embodiments herein, consensus is determined in accordance with the method as described in the thesis of Ethan Buchman, June 2016, University of Guelph, atrium.lib.uoguelph.ca/xmlui/handle/10214/9769. In different embodiments (not depicted), consensus may be determined using proof-of-work, proof-of-stake, or a different method.

The structure of the second node 104b is highlighted in FIG. 1. The other nodes 104a,c-l in the system 100 share analogous structures, although in different embodiments (not depicted) any one or more of the nodes 104 may differ in structure from each other.

Figure 3:
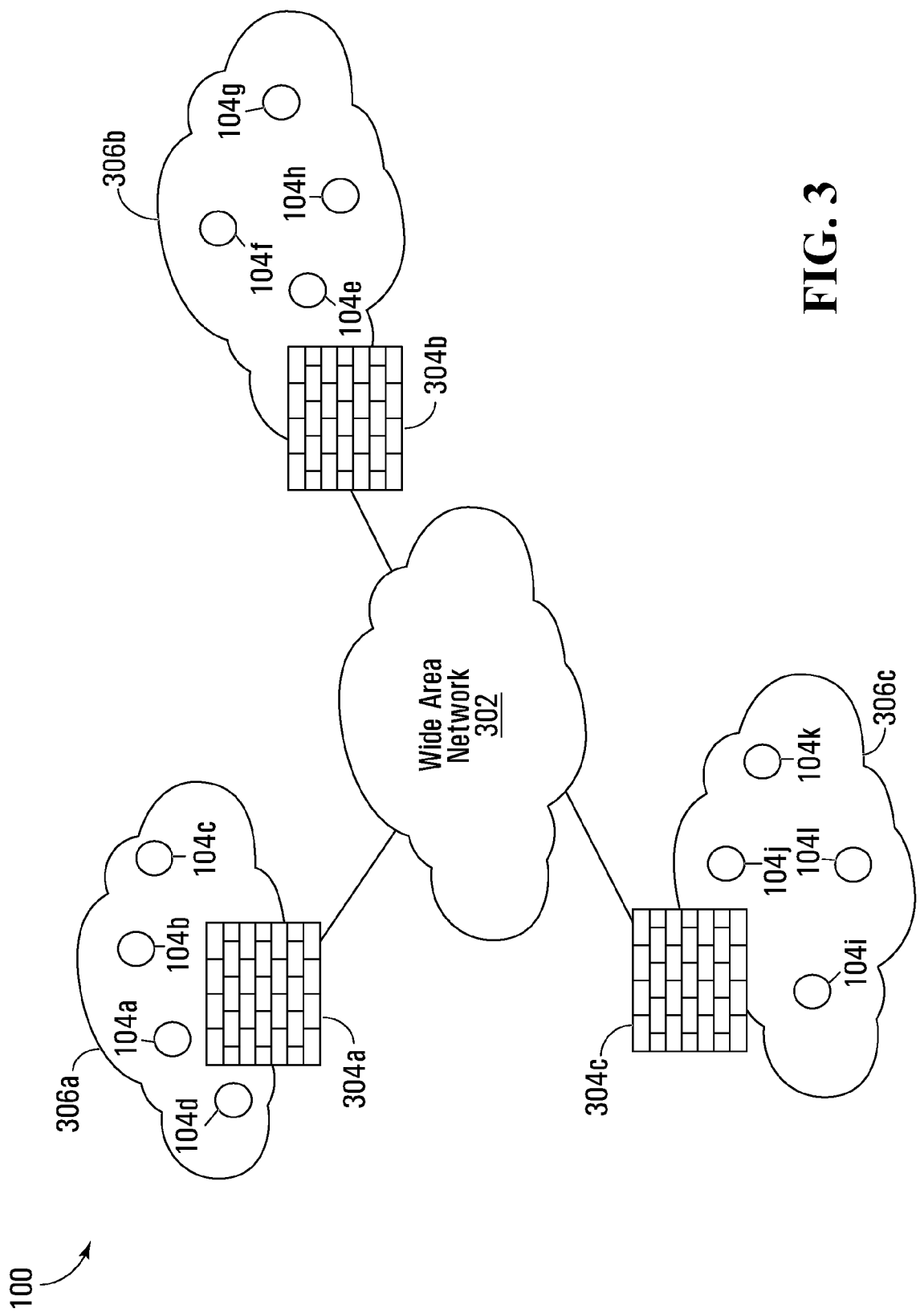
FIG. 3 depicts a physical network topology for the system of FIG. 1.

Referring now to FIG. 3, there is shown a physical network topology for the system 100 of FIG. 1. The system 100 comprises first through third local area networks ("LANs") 306a-c, each protected by a respective firewall 304a-c. The LANs 306a-c are communicatively coupled together via a wide area network ("WAN") 302, such as the Internet. The first through third blockchains 102a-c are respectively local to the first through third LANs 306a-c; each of the fourth through seventh blockchains 102d-g communicate through at least two of the firewalls 304a-c and the WAN 302.

Referring back to FIG. 1, the second node 104b comprises a processor 106 that controls the node's 104b overall operation. The processor 106 is communicatively coupled to and controls several subsystems. These subsystems comprise user input devices 108, which may comprise, for example, any one or more of a keyboard, mouse, touch screen, voice control; random access memory ("RAM") 110, which stores computer program code for execution at runtime by the processor 106; non-volatile storage 112, which stores the computer program code executed by the RAM 110 at runtime and which also stores the blockchains 102a,d of which the second node 104b is a part, as discussed in further detail in respect of FIG. 2; a display controller 114, which is communicatively coupled to and controls a display 116; and a network controller 118, which facilitates network communications with the other nodes 104a,c-l.

Figure 2:
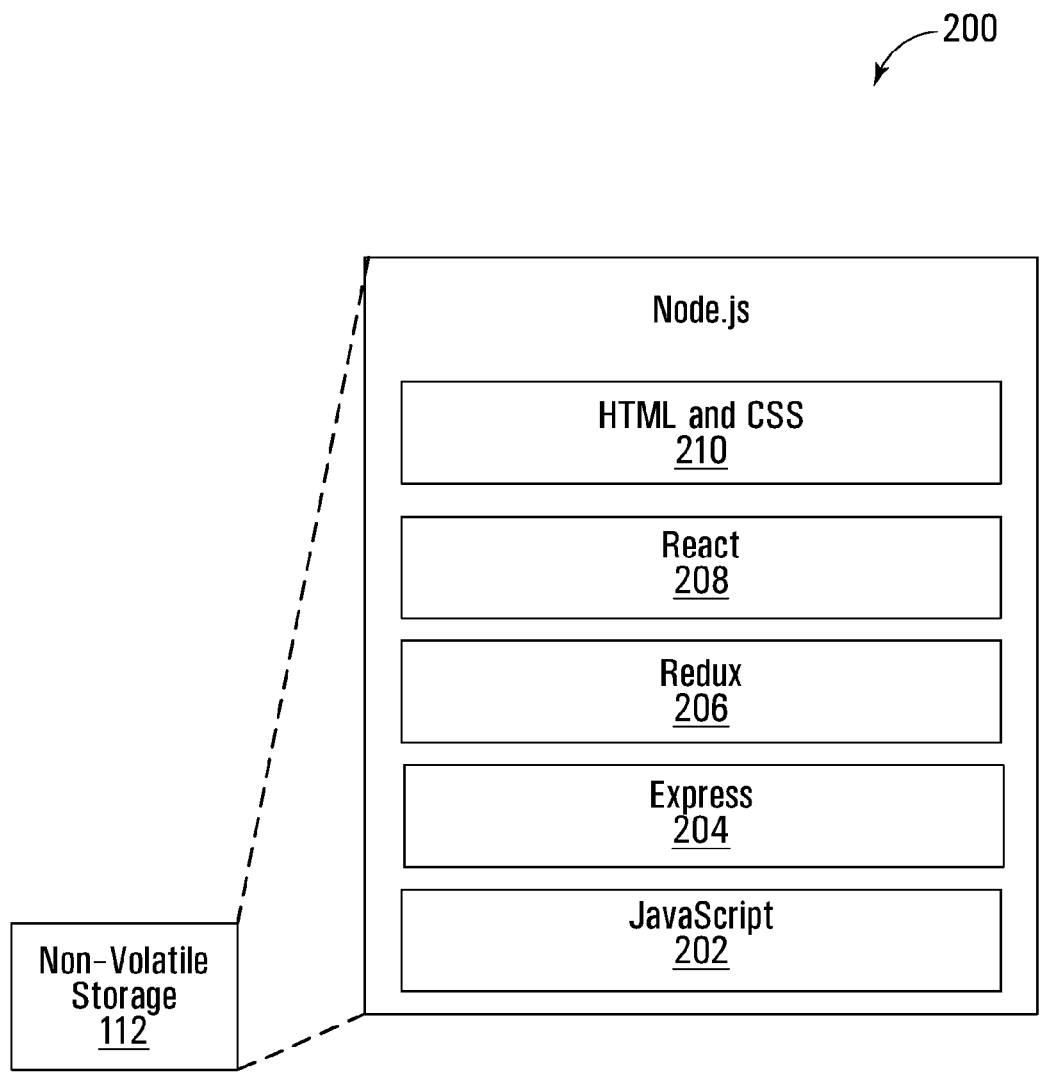
FIG. 2 depicts a software stack comprising part of the system of FIG. 1.

Referring now to FIG. 2, there is shown a software stack 200 comprising part of the system 100 of FIG. 1. The software stack 200 may be expressed as computer program code and stored in the non-volatile storage 112, and the processor 106 may load some or all of that computer program code into the RAM 110 as desired at runtime. The software stack 200 is based on Node.js and accordingly uses JavaScript 202 and, in particular, the JavaScript Express 204, Redux 206, and React 208 libraries. JavaScript 202 is used to implement the blockchain. JavaScript Express 204, Redux 206, React 208, and HTML and CSS 210 are used as a framework for application development. While JavaScript 202 and its associated libraries 204,206,208 are used in this example embodiment, in different example embodiments (not depicted) any one or more of them may not be used for implementation. For example, in certain different embodiments, even if none of the JavaScript Express 204, Redux 206, and React 208 libraries are used, application state may still be tracked using a cryptographically verifiable JSON object.

Figure 4:
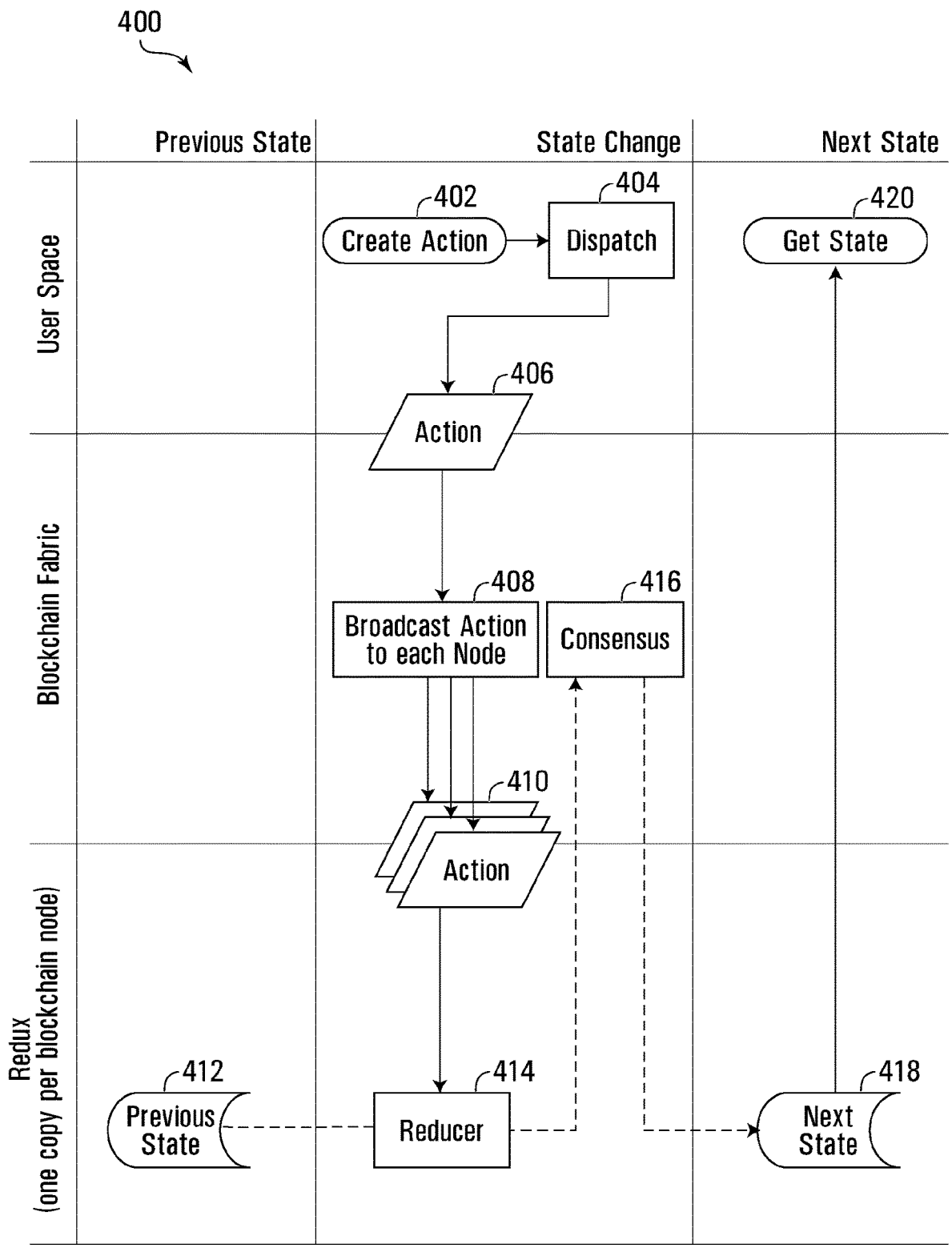
FIG. 4 depicts a flow diagram showing performance of an action to affect system state using a reducer and consensus being achieved for a blockchain, according to the system of FIG. 1.

An application is run as a smart contract on any one of the blockchains 102 in the system 100. FIG. 4 depicts a flow diagram 400 showing performance of an action by the system 100 to affect system state using a reducer and consensus being achieved for any one of the blockchains 102 by applying consensus as described above, according to the system 100 of FIG. 1. In the system 100, a Redux 206 store stores the application's state tree and accordingly is analogous to RAM for the application. An action is created in the user space at block 402, for example in response to user input via one of the user input devices 108, and is dispatched using an asynchronous variant of Redux's 206 dispatch( ) method at block 404 to the blockchain fabric (i.e., automatically to the other nodes 104 comprising the blockchain 102 by virtue of blockchain's peer-to-peer nature). The action transitions from the user space to the blockchain fabric at block 406 and propagates through the nodes 104 comprising the blockchain 102 at block 408. Each of the nodes 104 of the blockchain 102 consequently eventually receives a copy of the action at block 410, and each of the nodes 104 independently evaluates the effect of that action on the current state of the application, which it retrieves at block 412, by performing the action with a reducer at block 414. Once the node 104 performs the action at block 414, the blockchain 102 achieves consensus at block 416 as to the blockchain's 102 next state. The next state that results from that consensus is accepted by the nodes 104 as the correct next state at block 418, and is sent to the user space at block 420.

Figure 8A:
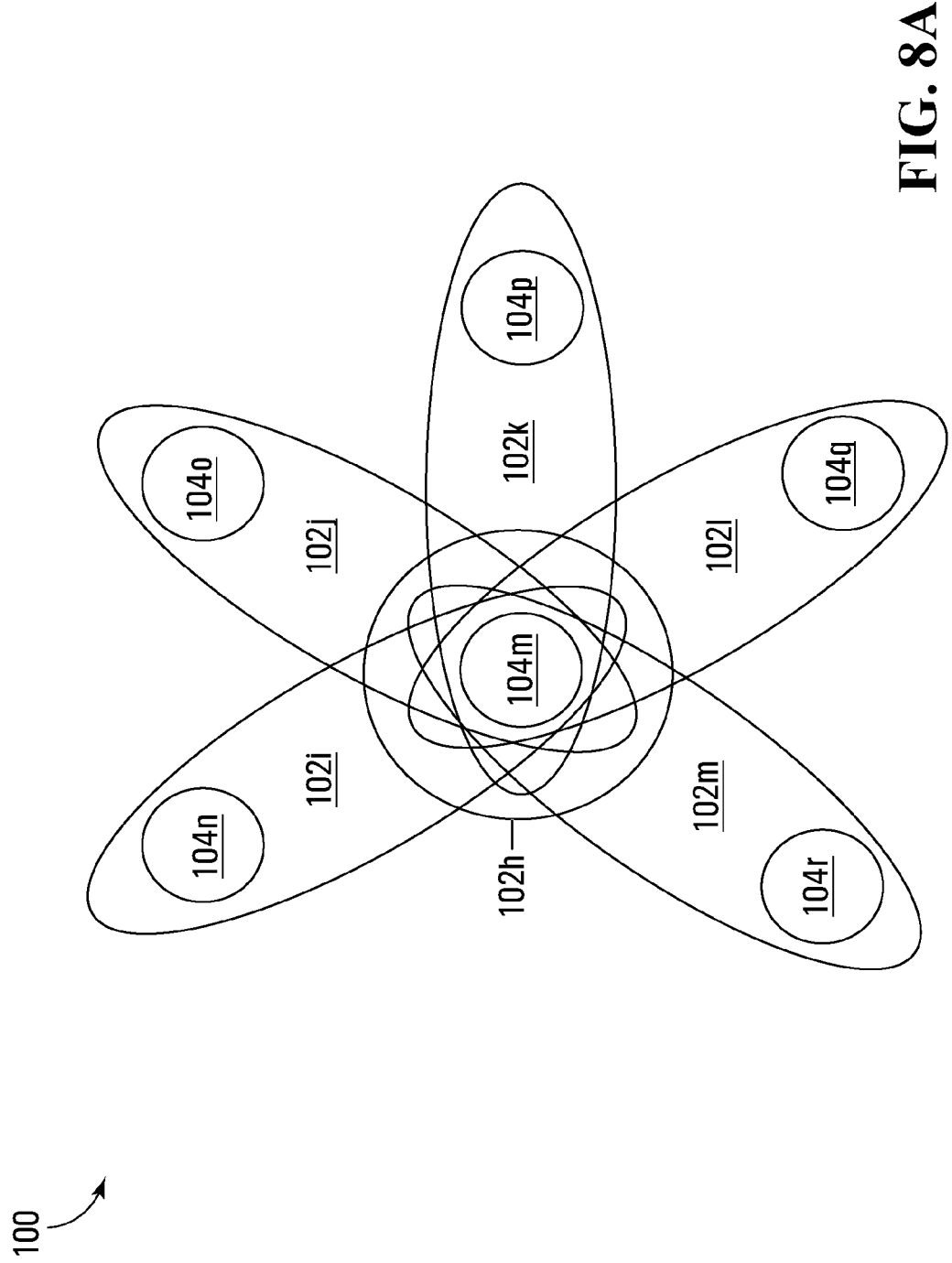
FIG. 8A depicts a system for facilitating data transfer between blockchains, according to another example embodiment.
Figure 8B:
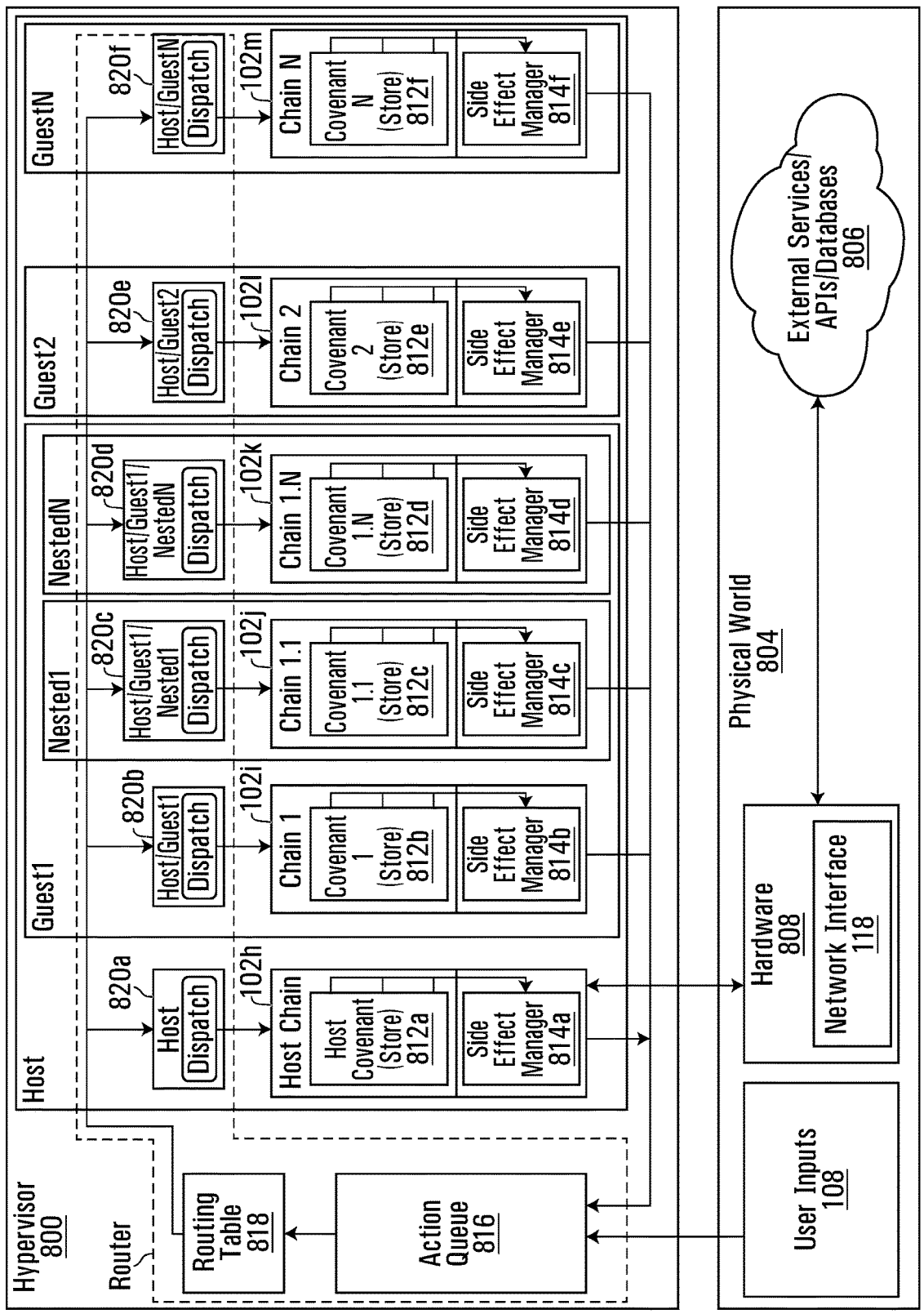
FIG. 8B depicts a block diagram of a hypervisor and the various blockchains running thereon, according to the system of FIG. 8A.

FIG. 8A depicts another example embodiment of the system 100 for facilitating data transfer between blockchains 102. The system 100 of FIG. 8A comprises a thirteenth node 104m, which is concurrently a member of six blockchains 102h-m: a host blockchain 102h, and eighth through twelfth blockchains 102i-m. The eighth through twelfth blockchains 102i-m also respectively comprise additional nodes 104n-r. Each of the blockchains 102h-m is paravirtualized on the thirteenth node 104m, although in different embodiments (not depicted) the blockchains 102h-m may be fully virtualized or, as discussed in further detail below, neither fully virtualized nor paravirtualized. FIG. 8B depicts a hypervisor 800 used for that paravirtualization, and shows the blockchains 102h-m running on the hypervisor 800.

In FIG. 8B, the eighth, eleventh, and twelfth blockchains 102i,l,m are nested within the host blockchain 102h, and the ninth and tenth blockchains 102j,k are nested within the eighth blockchain 102i (and consequently also within the host blockchain 102h). One blockchain 102 is "nested" within another blockchain 102 (the "parent blockchain 102") when the parent blockchain 102 executes an application to create the nested blockchain 102, and when the parent blockchain 102 accordingly can terminate the nested blockchain 102. In the depicted embodiment, the parent and nested blockchains 102 are otherwise equivalent.

The hypervisor 800 interfaces with the physical world 804 via computer hardware responsible for input/output operations ("I/O hardware"), such as the user input devices 108 that provide user input to the hypervisor 800, and disk access and network interface hardware 808 that perform disk access and network communication functions. The hardware 808 interfaces with various third party components 806 such as servers that provide external services, application programming interfaces, and databases.

The hypervisor 800 is implemented in JavaScript 202 and comprises an action queue 816, a router 818, and various operating environments for the blockchains 102h-m. The router 818 is communicatively coupled to first through sixth dispatch modules 820a-f in series, and the first through sixth dispatch modules 820a-f are in turn communicatively coupled to the blockchains 102h-m, respectively. The blockchains 102h-m each respectively comprises a store 812a-f for an application, with each store 812a-f effectively acting as RAM for an application on that blockchain 102h-m. In at least some example embodiments, an application stored on the blockchain comprises more than a smart contract. For example, an application may comprise a smart contract, which represents a function that returns a value; a saga, which performs actions other than returning a value, such as interactions with hardware; and the actions that interact with the smart contract and the saga. The actions that the saga performs, which are requested using the blockchain and the actual performance of which are performed without the blockchain achieving consensus, are herein referred to as "side effects". While the actual performance of the side effect or action is not subject to consensus, the determination made by the blockchain to perform the side effect is subject to consensus, and the determination made by the blockchain to accept the result of the side effect is also subject to consensus. Each of the applications in the stores 812a-f comprises a reducer that performs actions to determine blockchain state. Additionally, side effects, such as interactions between a blockchain 102 and hardware, that may result from the reducer performing that action are handled by side effect managers 814a-f for the stores 812a-f, respectively.

In one example embodiment, the method of FIG. 4 may be implemented using the hypervisor 800 of FIG. 8B, as follows. A user who creates an action by providing input via one of the user devices 108 generates an action at block 402, which is placed in the action queue 816. The action queue 816 also receives actions from the side effect managers 814a-f. The action queue 816 eventually dispatches the user generated action to the router 818, which routes it to the blockchains 102i-m relevant to that action; for the purposes of this example, the eighth blockchain 102i is the only blockchain 102 affected by the action. The router 818 routes the action directly to the third dispatch module 820c. This corresponds to block 406 in FIG. 4. The host blockchain 102h captures the action as soon as it is converted from hardware to an action; the I/O hardware (whether the user input device 108 or hardware 808) interacts with the host blockchain 102h and the action is consequently recorded in the host blockchain 102h before the action is even sent to the action queue 816. The router 818 routes actions in the action queue 816 to the appropriate dispatch module 812a-f. The router 818 sends actions to any given one of the chains 102i-m in the order in which those actions are placed in the action queue 816; however actions for different blockchains 102i-m may be sent to the dispatch modules 812a-f for those blockchains 102i-m out of order. For example, if the action queue 816 receives a first action for the eighth blockchain 102i, then a second action for the ninth blockchain 102j, and then a third action again for the eighth blockchain 102i, the router 818 may send the first and third actions to the eighth blockchain 102i before sending the second action to the ninth blockchain 102j. However, the router may not send the third action to the eighth blockchain 102i before the first action.

Once the action arrives at the eighth blockchain 102i, the thirteenth node 104m broadcasts the action to any other nodes 104 comprising part of that blockchain 102i, which as shown in FIG. 8A comprises the additional node 104n; this corresponds to blocks 408 and 410 in FIG. 4. The thirteenth node 104m communicates via the host blockchain 102h, which interfaces with the disk access and network interface hardware 808 as necessary to communicate with that additional node 104n. The additional node 104n eventually receives and performs the action at its reducer at block 414. Back at the thirteenth node 104m, the reducer comprising part of the second store 812b performs the action, and again via the host blockchain 102h shares the new state it determines to the additional node 104n. The eighth blockchain 102i eventually reaches consensus, which corresponds to block 416 of FIG. 4, with communication involving the node 104m on which the hypervisor 800 runs occurring again via the host blockchain 102h. Once consensus is reached, the eighth blockchain 102i settles on its new state at block 418, and relays this new state to the user again via the host blockchain 102h via the user input hardware 108, which corresponds to block 420.

A side effect in the form of a hardware operation may be required when a reducer performs an action. Any hardware operation is performed by the hypervisor 800 in response to an instruction from the host blockchain 108h; the host blockchain 108h consequently is aware of and records all hardware operations and related actions in its blocks. The host blockchain 108h also records the result of performing that action, which is the new application state for the blockchain 102 that received the action. Each blockchain 108 also returns a "success" or "failure" indicator after an action is performed, indicating whether the action was successfully performed, which the host blockchain 108h also records.

In the depicted example embodiment, the host blockchain 108h also monitors and handles resource allocation for compute operations (operations that do not use the I/O hardware but that do require the node's 104m processor) that satisfy at least one of a processor time and processor intensity threshold. This permits the host blockchain 108h to allocate and store processor resources for particularly computationally intensive tasks, such as certain cryptographic tasks.

While in FIGS. 8A and 8B the thirteenth node 104m is described as communicating with the additional nodes 104n-r via the disk access and network interface hardware 808, in different embodiments (not depicted) communication may be between blockchains 102 that are hosted on the same node 104 and even running on the same hypervisor 800. In those example embodiments, communication between blockchains 102 can be done with lower latency and a lower transmission time than when communication need be done through the hardware 808.

The applications on the blockchains 102h-m are configured such that all hardware interactions with any of the blockchains 102i-m occur via the host blockchain 102h. For example, all network communications, which occur via the disk access and network interface hardware 808, and user interactions, which occur via the user input devices 108, are performed by the eighth through twelfth blockchains 102i-m via the host blockchain 102h. The host blockchain 108h accordingly is configured to interact with all hardware as instructed by any of the blockchains 108i-m nested therein. The host blockchain 102h records in its blocks all hardware operations (requests and responses, and user inputs conveyed via hardware) and application states of the applications running on each of those nested blockchains 102i-m. In some different embodiments (not depicted), the host blockchain 102h may record some and not all of the operations involving the I/O hardware. The host blockchain 102h also records all actions that are routed to the blockchains 102i-m at least by virtue of those actions being routed through the router 818 and, if those actions require I/O hardware usage, by virtue of that as well. This permits a user access to the entire state history and hardware operations of all of those nested blockchains 102i-m. That user accordingly is able to revert to a previous application state of any of the blockchains 102i-m and adjust the order of actions in the action queue 816 to simulate how the hypervisor 800 and blockchains 102i-m would have reacted had the actions arrived in a different order than the original order they were in fact received; in one example use case, this is done when an application throws a fault. This permits the system 100 to be thoroughly tested by virtue of allowing simulation of different timing errors that the system 100 may experience. The blocks of each of the nested blockchains 102i-m for a subset of the data contained within the blocks of the host blockchain 102h. During debugging or testing, a user may select any action from the action queue 816 for routing to the blockchains 102i-m via the router 818, regardless of the order in which the action queue 818 received the actions. The input/output operations are made to be procedural and deterministic; consequently, the hardware responds to an action in the same manner regardless of when it receives that action, which facilitates changing the order of actions during debugging or testing.

Another node may connect to the host blockchain 108h, and the reverting of the application to an earlier state may be done in response to input from that other node. This other node may, for example, be that of a third provider providing technical support.

While the depicted example embodiment shows the blockchains 102h-m as paravirtualized on the hypervisor 800, in different embodiments (not depicted) neither fully virtualization nor paravirtualization need be used. In some of those different embodiments, some of the nodes 104 fully virtualize or paravirtualize the blockchains 102h-m using the hypervisor 800 while others do not. Additionally, in some of those different embodiments in which at least one of the nodes 104 uses the hypervisor 800 for fully virtualization or paravirtualization, some or all of the blockchains 102h-m may be fully virtualized or paravirtualized. For example, while the flow diagram 400 of FIG. 4 may be implemented using the hypervisor 800 of FIG. 8B, in different embodiments (not depicted) virtualization need not be used for its implementation.

Chain Joining

While all of the nodes 104 on any given one of the blockchains 102 have access to all the data stored on the blockchain 102, different blockchains 102 do not by default share data between each other. The method of chain joining, described below, permits data to be shared between different blockchains 102.

Figure 5A:
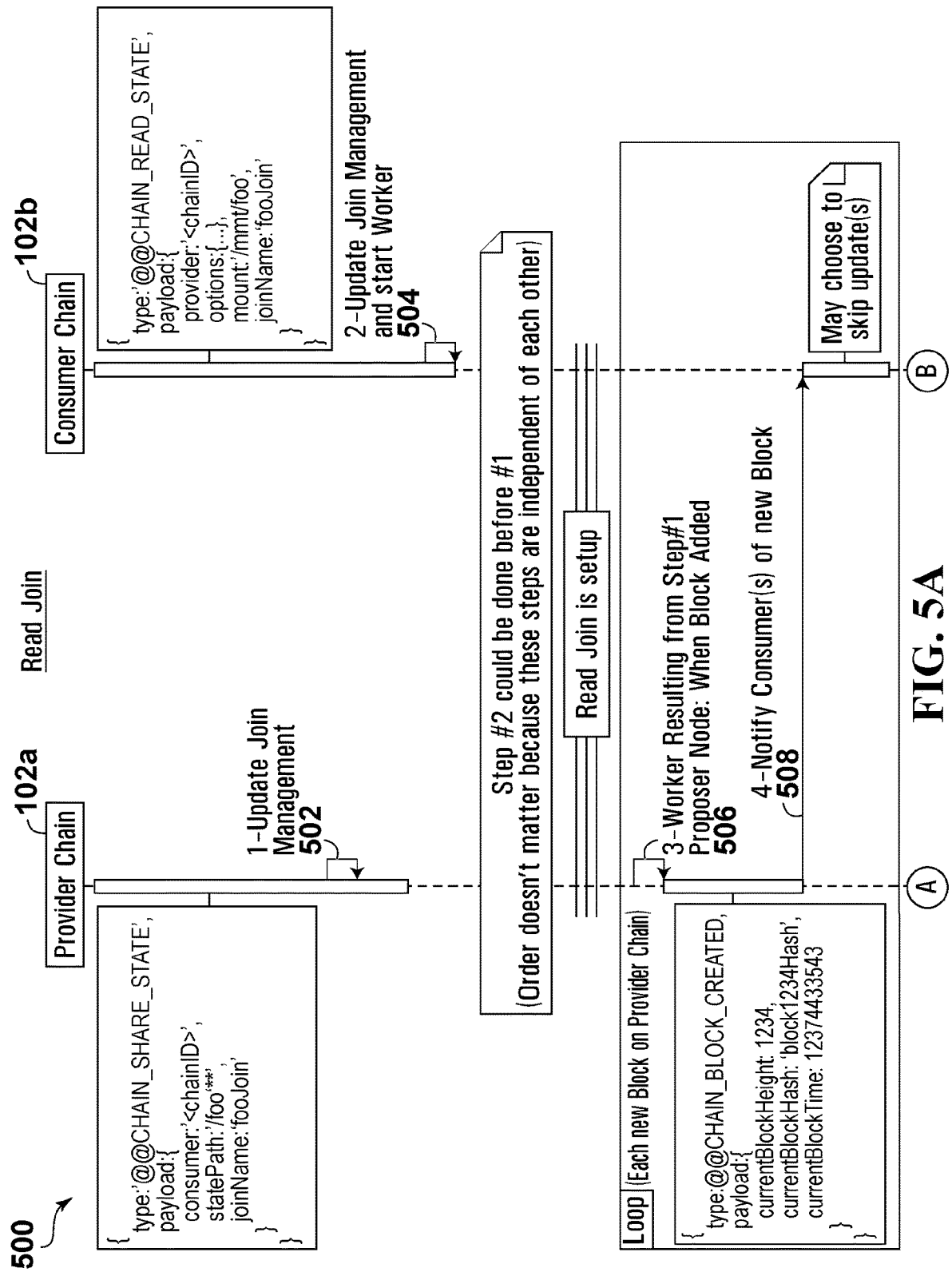
FIGS. 5A and 5B depict a UML sequence diagram showing how two blockchains perform a read join, according to the system of FIG. 1.
Figure 5B:
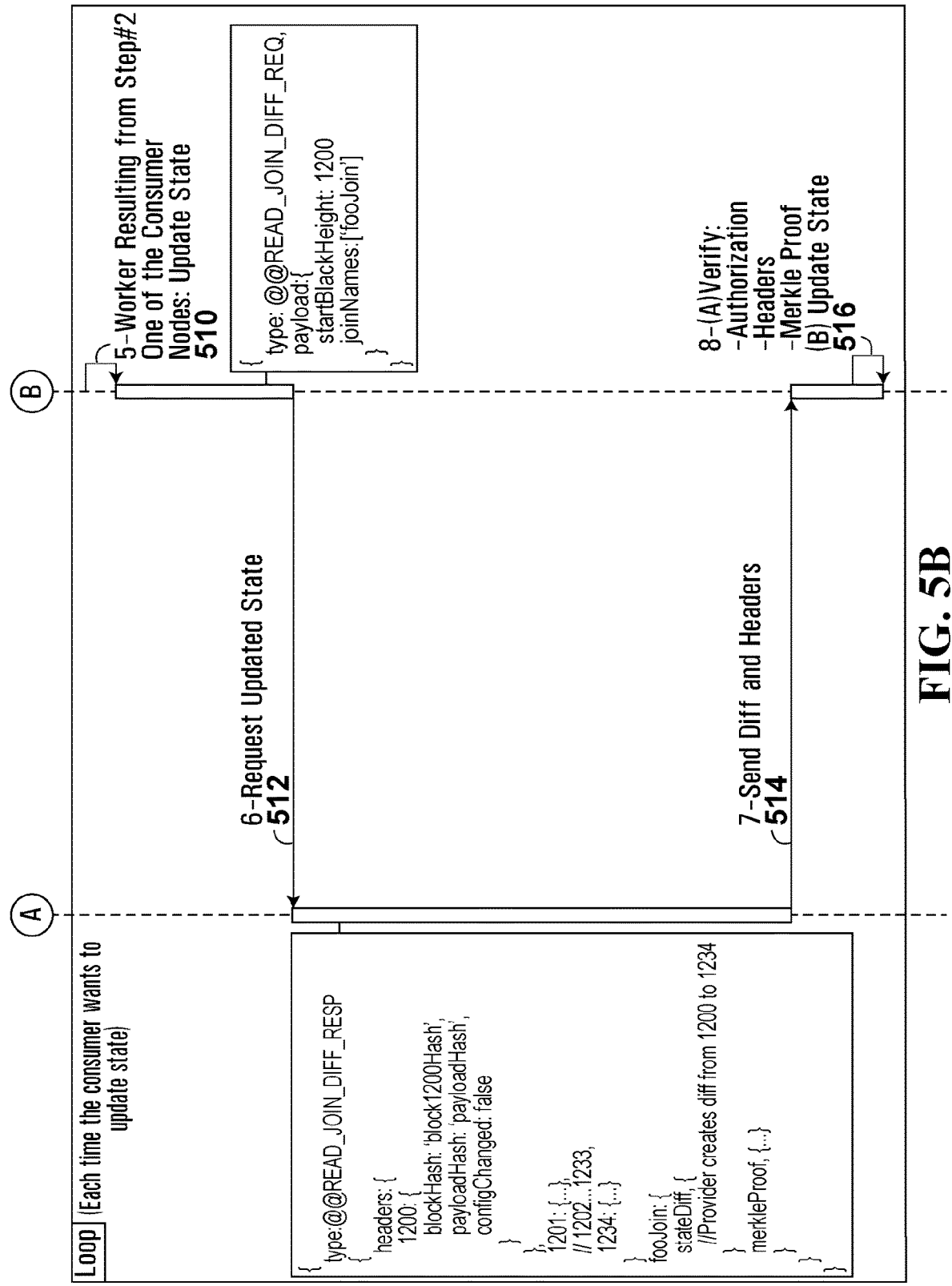

FIGS. 5A and 5B depict a UML sequence diagram 500 showing how two blockchains 102a,b perform a read join, according to the system 100 of FIG. 1. While the first and second blockchains 102a,b are used in the diagram 500, a read join may be performed between any two blockchains 102. For example, while the first and second blockchains 102a,b do not share any nodes 104, a read join may be performed between blockchains 102 that share nodes 104 and, in some example embodiments, that are virtualized (fully or paravirtualized) on at least some of the same nodes 104 using, for example, the hypervisor 800.

In the diagram 500, the second blockchain 102b reads data from the first blockchain 102a; for the purposes of the diagram 500, the second blockchain 102b is accordingly interchangeably referred to as the "consumer chain 102b" and the first blockchain is accordingly interchangeably referred to as the "provider chain 102a".

At operation 502, the provider chain 102a updates its join management routine. A user commences this by providing input via one of the user input devices 108 of one of the nodes 104a-d comprising the provider chain 102a. The user input is dispatched as an action ("@@CHAIN-_SHARE_STATE") by the router 818 to the provider chain 102a on that node 104 for performance by that chain's 102a reducer. The action's payload is digitally signed so that it is cryptographically verifiable (i.e., any tampering can be detected). The action's payload comprises a chain identifier of the consumer chain 102b ("<chainID>"), a path identifying the proper subset of the state data of the provider chain 102a to be read by the consumer chain 102b ("statePath: '/foo/'"), and an alias identifying this particular chain join ("joinName: 'fooJoin'"). In the diagram 500, the state information available to the provider chain 102a is represented using a directory tree. The root of the tree having path "/" represents all the state data available to the provider chain 102a; and subdirectories, such as "/foo/", represent a proper subset or "slice" of that state data.

The chain identifier is unique and is generating by digitally signing a value comprising the provider chain's 102a genesis block modified to contain a random seed. The random seed ensures uniqueness. At any time during the read join, the provider chain 102a may confirm the identity of the consumer chain 102b using the chain identifier and only send the slice of state data to the consumer chain 102b when the attempt to confirm that identity is successful.

At operation 504, the same or a different user provides input via one of the user input devices 108 of one of the nodes 104e-h comprising the consumer chain 102b. The user input is dispatched as an action ("@@CHAIN_READ-_STATE") by the router 818 to the consumer chain 102b on that node 104 for performance by that chain's 102b reducer. The action's payload is a cryptographically secure chain identifier of the provider chain 102a ("<chain ID>"), a path identifying where the state data is to be stored ("mount: '/mnt/foo'", with the state data that is read by the consumer chain 102b is stored using the model of a mounted filesystem), an alias identifying this particular chain join ("joinName: 'fooJoin'"), and various options for the read join. Example options comprise a data age limit, which requires data being transmitted via the read join to be less than a certain age to be usable for all or some actions; a frequency threshold, which defines how quickly the read join is to repeat to update the state data on the consumer chain 102b; and a maximum size limit, which sets a flag if the data transmitted by the read join exceeds a maximum limit.

Once operations 502 and 504 have been performed, the read join is initialized. Operations 502 and 504 may be performed concurrently or one of the operations 502,504 may be performed before the other of the operations 502, 504.

Once the read join is initialized, the provider chain 102a enters into a loop comprising operations 506 and 508 that it performs for each block on the chain 102a. An action ("@@CHAIN_BLOCK_CREATED") is generated each time a new block is added to the provider chain 102a. New block creation comprises the provider chain 102a application deciding to create a block, which triggers a side effect, which when the hypervisor 800 is used is handled by the side effect manager 814. The action's payload is the block height for that new block ("currentBlockHeight: 1234"), the hash of that new block's header ("currentBlockHash: block1234Hash"), and a timestamp identifying when that block was created ("currentBlockTime: 12374433543"). In some example embodiments, the timestamp is omitted. At operation 508, the provider chain 102a sends an update in the form of the @@CHAIN_BLOCK_CREATED action to the consumer chain 102b, notifying the consumer chain 102b that a new block has been created. The update comprises the height and header hash of that new block. The consumer chain 102b may choose to accept and receive a copy of the slice of the state data stored by the newly created block, or skip the update.

When the consumer chain 102b chooses to receive an update from the provider chain 102a, operations 510, 512, 514, and 516 are performed for each update. At block 510, the consumer chain 102b generates an action ("@@READ-_JOIN_DIFF_REQ") having a payload of the starting block height of the provider chain 102a for which the data transfer is to begin ("startBlockHeight: 1200"), which the consumer chain 102b knows from operation 504 (the last time it was set) and which the consumer chain 102b will update at operation 516 as discussed below; a hash of the header of the block at the starting block height (not shown in FIG. 5B) and the alias for the join ("joinNames: [fooJoin]"). At operation 512, the consumer chain 102b requests the updated slice of state data from the provider chain 102a by sending the @@READ_JOIN_DIF_REQ action to the provider chain 102a.

In response to the request, the provider chain 102a performs an action ("@@READ_JOIN_DIFF_RESP") to generate the response to the request. In response to the action, the provider chain 102a retrieves a header for each of the blocks (regardless of whether a slice of state data is sent from that block, as the headers are used to verify lineage) (blocks 1200 to 1234). Each header comprises a hash of the header of the immediately preceding block in the chain 102a ("previousBlockHash: 'block1199Hash'"); a hash of that block's entre application state, even though only a slice of that state data is to be transmitted ("payloadHash: 'payloadHash'"); a sufficient number of digital signatures of the nodes of the first blockchain to establish that consensus was reached for that block; and a flag indicating whether an aspect of the chain configuration has changed (i.e., when an aspect that affects the ability to verify block lineage changes), such as when an encryption method (e.g., the type of hash) has changed, when the list of nodes that is entitled to vote for consensus changes, when the digital signature(s) used changes, and when header format changes ("configChanged: false"). The action also generates a hash of the block header ("blockHash: 'block1200Hash'"), which does not comprise part of the header itself. The chain 102a also determines a difference in the state data from the starting block height (1200) to the current block height (1234) ("stateDiff: {//Provider creates diff from 1200 to 1234}"), so as to avoid sending unnecessary data to the consumer chain 102b. The provider chain 102a also determines a Merkle proof ("merkleProof"), which comprises one or more hash values selected to permit the consumer chain 102b to determine a Merkle path from a hash of the application data sent to the second blockchain to a Merkle root, which in this example is in the payloadHash field. The provider chain 102a sends the data generated in response to the @@READ_JOIN_DIFF_RESP action to the consumer chain 102b at operation 514.

In this example embodiment, the hash of the application data is a Merkle root and comprises all actions used to make the block and the last state resulting from the application performing all of those actions in order. In a different example embodiment, the block may store each state that results from performing each of the actions, or a subset of those states. For each block being transmitted, the hash of that block and of the header of a block immediately below that block, the hash of that block's application data, and the hash of the digital signatures collectively represent one example of lineage verification data that the consumer chain 102b may use to verify the lineage of that block back to the genesis block of the chain.

In this example embodiment, the merkleProof field is one example of validity verification data, which permits the consumer chain 102b to verify validity of the application data it receives from the provider chain 102a. While Merkle trees are used in this example, Merkle trees are only one example form of cryptographic proof. Other possible ways exist. The proof mechanism allows a single root hash, and a series of other hashes used in some structure, to allow verification of a piece of data by relating it back to the root hash without disclosing any of the other data that was not intended to be shared. Other data structures that may be used, for example, comprise Patricia Trees, Radix Trees, and chunked concatenations.

The consumer chain 102b subsequently verifies the authenticity of the data it receives at operation 516. More specifically, it verifies the transmitted block's lineage using the lineage verification data, the validity of the proper subset of state data it received using the validity verification data, and adds a new block to the consumer chain 102b. More specifically, the consumer chain 102b verifies the provider chain's 102a digital signature; verifies each transmitted block's lineage using the hashed header information; checks the validity of the transmitted state data using the data's Merkle tree; verifies the type of consensus method used, which may be changed using the configChange field as described above; verifies that a sufficient number of nodes 104 have contributed to the consensus of the block by checking the signatures of the nodes that voted in favor of consensus; and verifies the cryptographic validity of the block in accordance with the cryptographic method used by the chain 102a.

The consumer chain 102b then updates the mounted directory where it stores state information (/mnt/foo), which itself comprises the consumer chain 102b adding a new block to itself with the non-header data of that new block comprising the data received from the provider chain 102a (i.e., the lineage verification data, proper subset of state data, and validity verification data).

In summary, the read join permits a user of the consumer chain 102b to read a slice of state data stored on the provider chain 102a as though that data were mounted locally on the consumer chain 102b.

Figure 6:
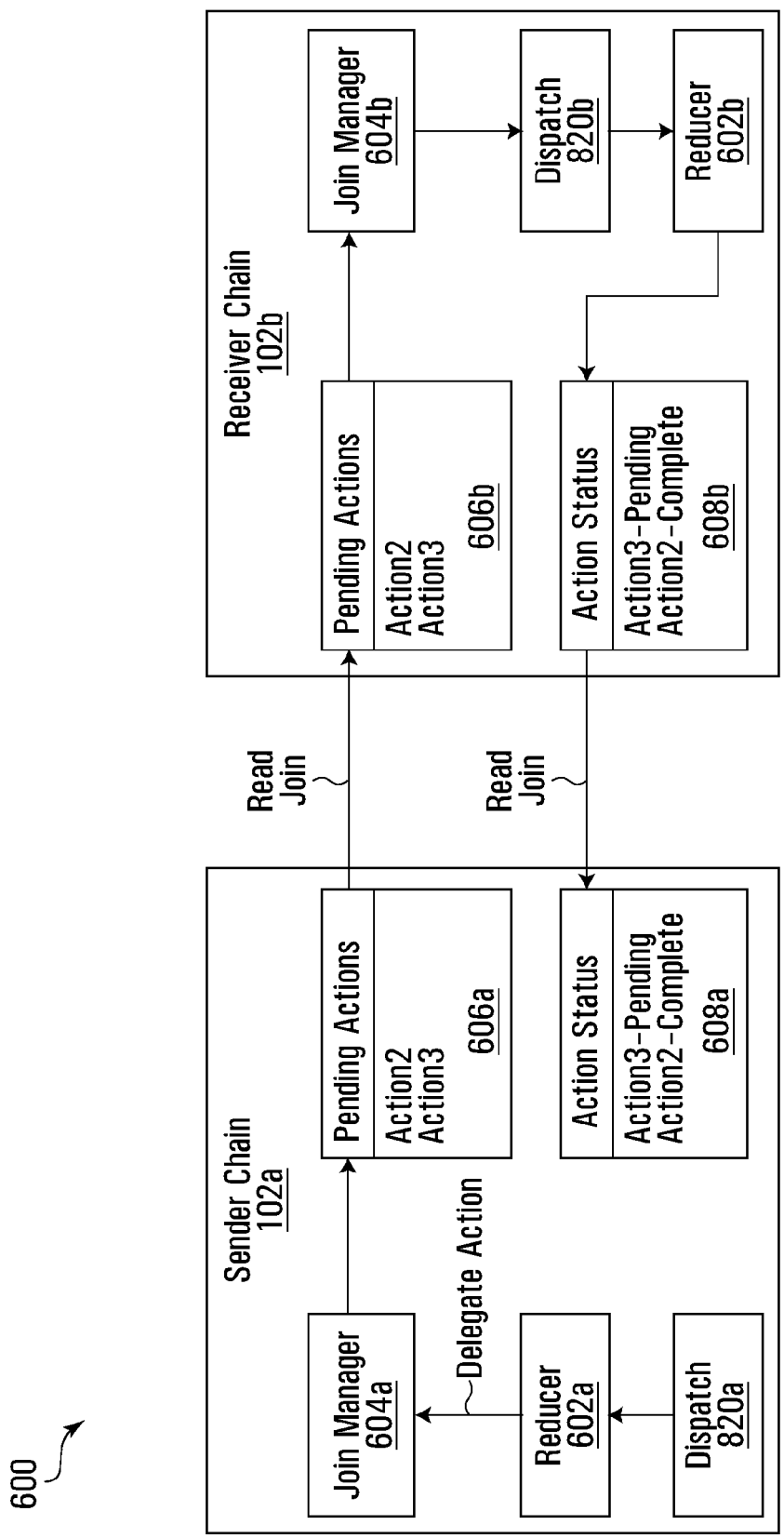
FIG. 6 depicts a block diagram showing how two blockchains perform a write join, according to the system of FIG. 1.

Referring now to FIG. 6, there is depicted a block diagram 600 showing how two blockchains perform a write join, according to the system 100 of FIG. 1. As with FIGS. 5A and 5B, while the first and second blockchains 102a,b are used in the example of FIG. 6, a write join may be performed between any two blockchains 102 regardless of whether they have overlapping nodes 104 and regardless of whether any nodes are virtualizing chains using the hypervisor 800. In FIG. 6, the first blockchain 102a writes data to the second blockchain 102b; the first blockchain 102a is accordingly interchangeably referred to as the "sender chain" 102a and the second blockchain 102b is accordingly interchangeably referred to as the "receiver chain" 102b.

The sender chain 102a comprises a dispatch module 820a, which dispatches actions to a reducer 602a. As discussed in further detail below in respect of FIGS. 7A to 7C, the reducer 602a delegates performance of certain actions to a join manager 604b, which controls which actions are queued in a pending actions queue 606a for transmission to the receiver chain 102b. The actions are sent to the receiver chain 102b via a read join. The sender chain 102a also comprises an action status queue 608a that reads, via a read join, a list of which actions have been completed by the receiver chain 102b.

The receiver chain 102b analogously comprises a pending actions queue 606b that receives the actions via the read join from the sender chain's 102a pending actions queue 606a. The received actions are sent to a join manager 604b, which forwards them to a dispatch module 820b and updates an action status queue 608b to indicate that the action is pending. The dispatch module 820b forwards those actions to a reducer 602b, which performs them, thereby changing the receiver chain's 102b state data and performing a write operation. The join manager 604b also, after the reducer 602b performs the action, updates the action status queue 608b to indicate that the action has been completed. The statuses in the action status queue 608b are sent to the sender chain's 102a action status queue via a read join. The write join of FIG. 6 accordingly is implemented using two read joins.

Figure 7A:
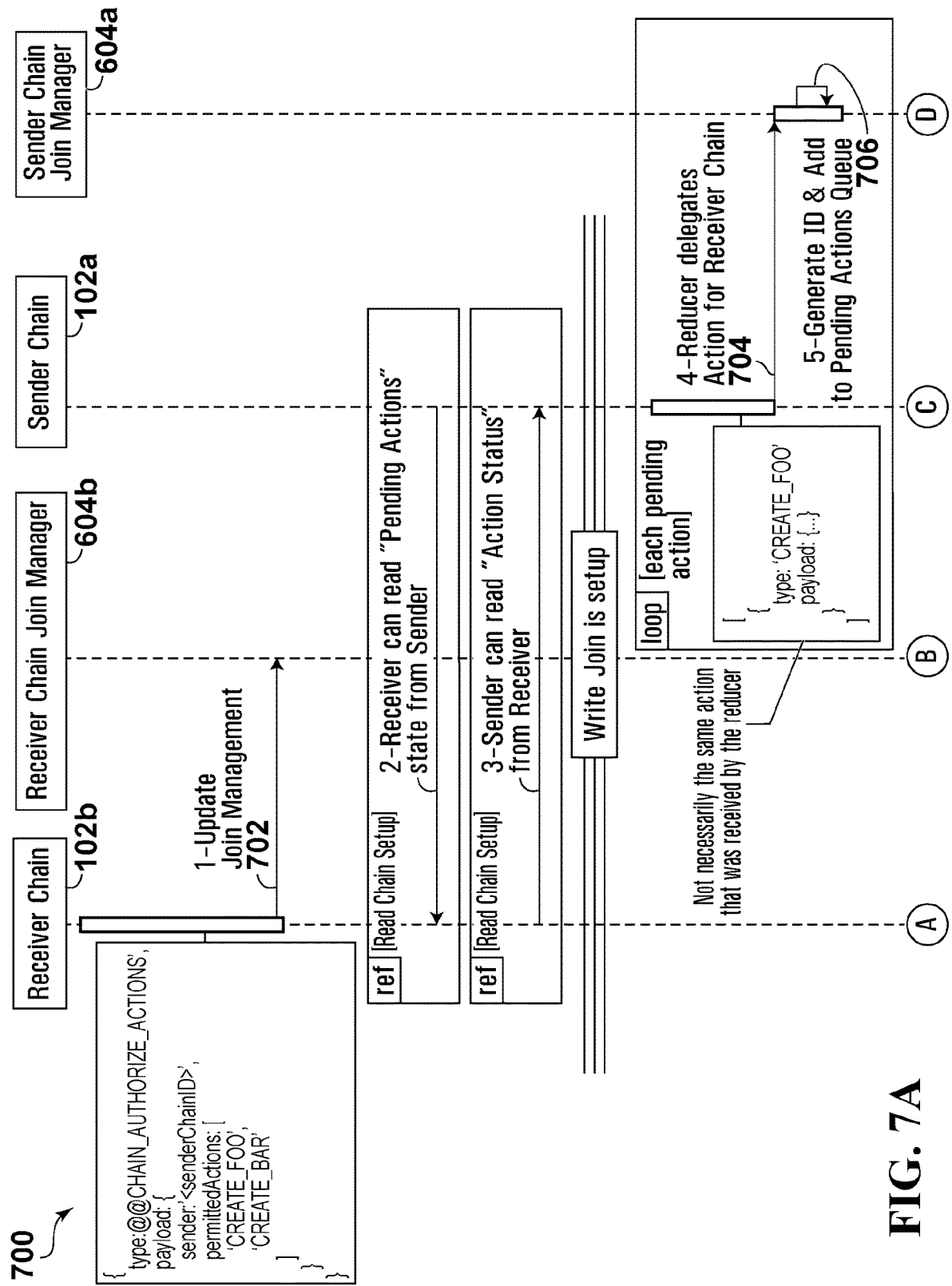
FIGS. 7A to 7C depict a UML sequence diagram showing how two blockchains perform a write join, according to the block diagram of FIG. 6.
Figure 7B:
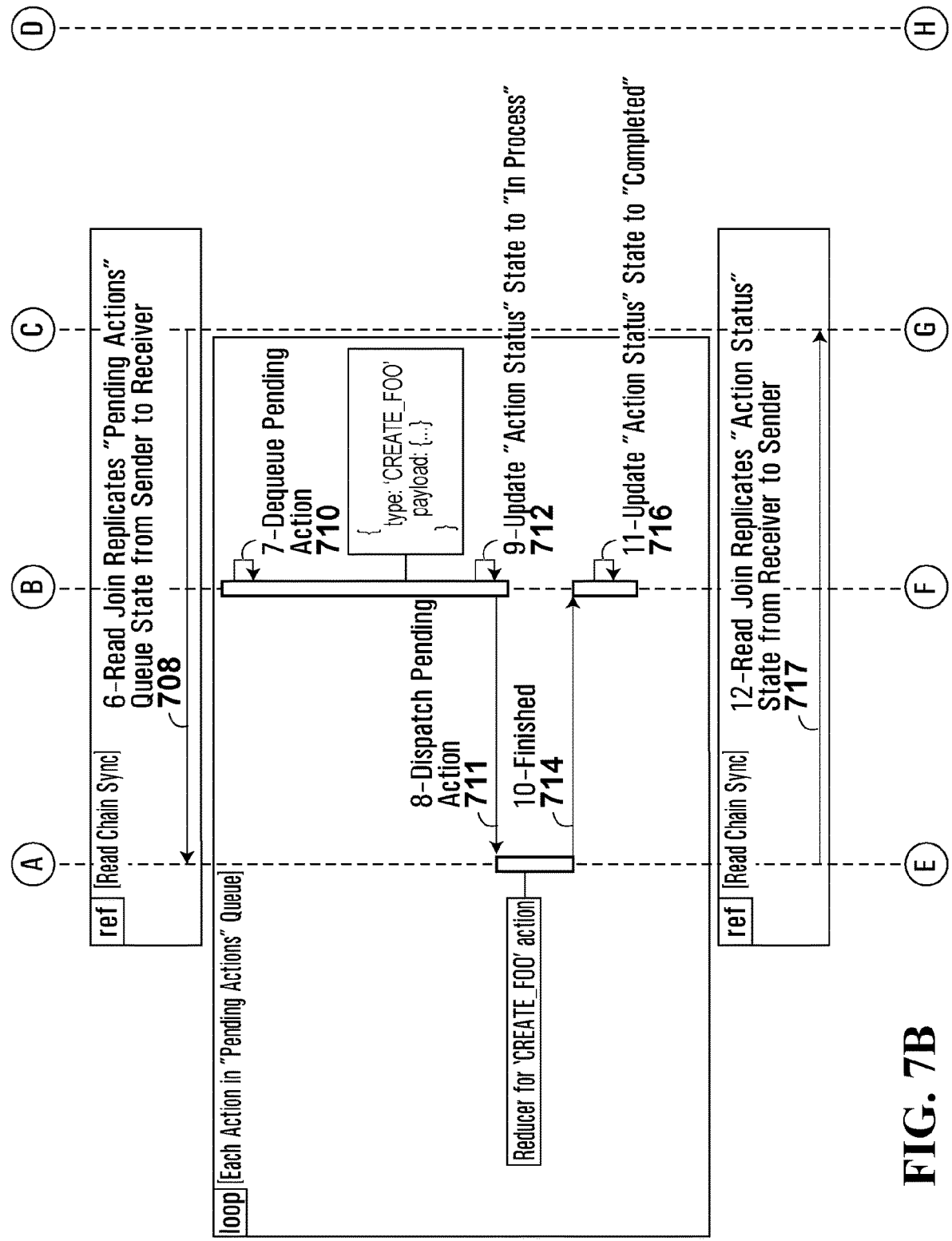
Figure 7C:
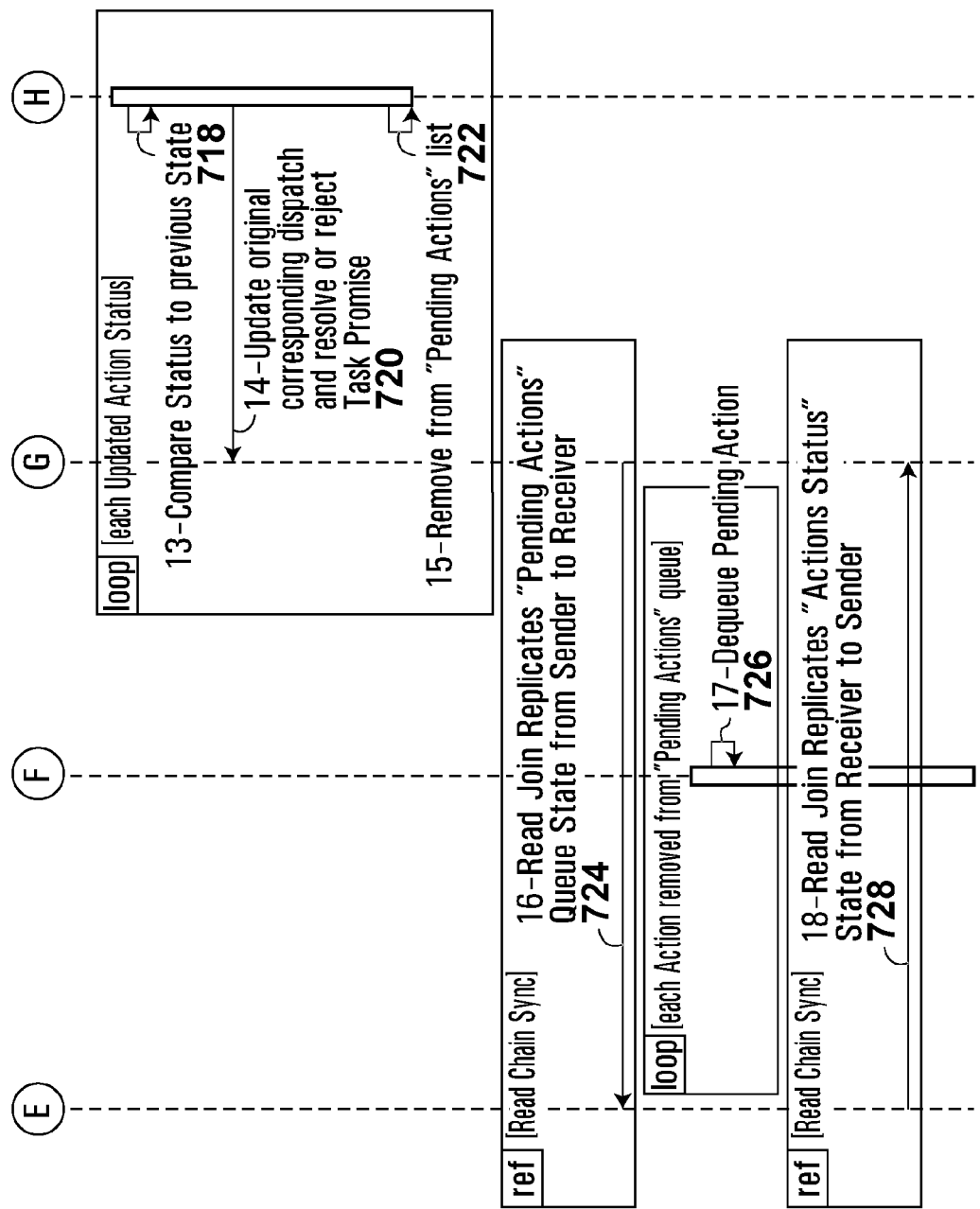

FIGS. 7A to 7C depict a UML sequence diagram 700 showing how two blockchains 102a,b perform a write join, according to the block diagram 600 system of FIG. 6. The objects in the diagram are the sender and receiver chains 102a,b, the sender chain's 102b join manager 604a, and the receiver chain's 102b join manager 604b. While the join managers 604a,b are shown as being objects distinct from the chains 102a,b, this is done for convenience only and the managers 604a,b comprise part of the application logic performed by the chains 102a,b.

At operation 702, the receiver chain's 102b join manager 604b performs an action ("@@CHAIN_AUTHORIZE_ACTIONS") having a payload comprising a cryptographically secure chain identifier identifying the sender chain 102a ("sender: <senderChainID>") and enumerating the actions that the sender chain 102a is permitted to have the receiver chain 102b perform ("permittedActions: ['CREATE_FOO'; 'CREATE_BAR']"). The cryptographically secure chain identifier is generated in a manner analogous to the chain identifiers for FIG. 5A. Following this, the receiver chain's 102b pending actions queue 606b is able to read actions from the sender chain's 102a pending actions queue 606a, and the sender chain's 102a action status queue 608a is able to read the status of actions from the receiver chain's 102b action status queue 608b. After the queues 606a,b and 608a,b are able to communicate, the write join is setup. In the depicted embodiment, the sender chain 102a is by default authorized to perform certain actions received from the receiver chain 102b, so authorization is not explicitly shown in FIGS. 7A to 7C.

For each action the sender chain 102a wishes to send to the receiver chain 102, the sender chain 102a performs operations 704 and 706. For each action, the sender chain 102a creates an action of one of the permitted enumerated types ("type: 'CREATE_FOO'"). The action created by the reducer 602a may or may not be identical to the action that was dispatched to it. The reducer 602a then delegates the action at operation 704 to the join manager 604a, following which the join manager 604a generates an identifier for that action and places it in the pending actions queue 606a at operation 706. That action is transmitted, via a read join, from the sender chain's 102a pending actions queue 606a to the receiver chain's 102b pending actions queue 606b at operation 708.

In order to make efficient use of the overhead accompanying each read join, such as that required for cryptographic checks and consensus, multiple actions may be queued in the sender chain's 102a pending actions queue 606a and transmitted via a single read join.

For each action that the receiver chain 102b receives, it performs operations 710, 711, 712, 714, and 716. At operation 710, the receiver chain's 102b join manager 604b removes the pending action from the pending actions queue 606b, dispatches the action to the reducer 602b at operation 711, and updates the action status queue 608b to indicate that the action is in process. The reducer 602b performs the action, informs the join manager 604b at operation 714, and the join manager 604b updates the action status queue 608b to indicate that the action is completed at operation 716.

At operation 717, the sender chain's 102a action status queue 608a is updated to correspond to the receiver chain's 102b action status queue 608b via a read join.

For each updated action status, the sender chain 102a performs operations 718, 720, and 722. At operation 718, the join manager 604a compares the action's status in the action status queue 608a to the action's previous status. At operation 720 it updates the dispatch that originally dispatched the action to the reducer 602a, returning to the user any information that is to be returned following completion of the action (e.g., a notification to the user indicating that the action has been completed). The join manager 604a then removes the completed action from the pending actions queue 606a at operation 722.

At operation 724, the pending action queues 606a,b of the chains 102a,b are synchronized using a read join, following which the receiver chain's 102b join manager 604b removes the action from the pending action queue 606b (operation 726). After the action is removed, the action status queues 608a,b are synchronized using a read join at operation 728.

The sender chain 102a receives actions from the receiver chain 102b via read joins that the action is pending at the receiver chain 102b (operation 717) and that the action has been performed by the receiver chain 102b (operation 728). For each read join, the sender chain 102a also receives lineage verification data and validity verification data analogous to that described above for FIGS. 5A and 5B.

The diagrams 500,700 of FIGS. 5A-7C depict actions being transmitted between chains 102. Although not expressly illustrated in those figures, each action is sent in a block for which the first chain 102 has reached consensus, so that a second chain 102, which receives the action, can verify that the action in fact comes from the first chain and has not been tampered with.

Payload Layer

In at least some example embodiments, it may be desirable to store, on a blockchain, a large binary file (hereinafter interchangeably referred to as a "binary large object" or a "blob"). However, conventionally storing a blob on a blockchain requires propagating the blob to the blockchain's nodes before the file can be added in full to the blockchain, which can take a significant amount of time when the blob is of a certain size. For example, in a blockchain having a maximum block size of 2 MB and that requires 2 seconds to add a block to the blockchain, adding a 100 MB blob to the blockchain requires 100 seconds. During this latency period, in a conventional implementation the ability to use the blockchain to store data unrelated to the blob is practically quite constrained.

In certain example embodiments herein, a payload layer that runs on each node of a blockchain is used to distribute a blob to other nodes of the same blockchain, nodes of a different blockchain, or both. Distributing a blob using the payload layer does not require using the blockchain itself to share the blob using chain joining, nor is the blob itself stored on the blockchain. Rather, in at least some example embodiments a hash and a path of the blob are stored on the blockchain. Compared to the size of the blob itself, the blob's hash and path are a relatively small amount of data that typically can be quickly stored in a single block of the blockchain. Propagation of the blob itself to the nodes of the blockchain using the payload layer can be performed without practically monopolizing the blockchain, thereby avoiding the delay of dividing the blob up between many different blocks and adding them all to the blockchain as described above.

Additionally, in at least some example embodiments, chain joining may be used to permit a first blockchain to send to a second blockchain the path and hash of many blobs. A node on the second blockchain, using the payload layer (i.e., without using the first or second blockchain, and therefore without chain joining), can then request a single one of those blobs by sending that blob's hash to the payload layer of a node comprising part of the first blockchain. The payload layer of that first blockchain node then sends the blob to that second blockchain node, again without using the first or second blockchain.

Figure 9:
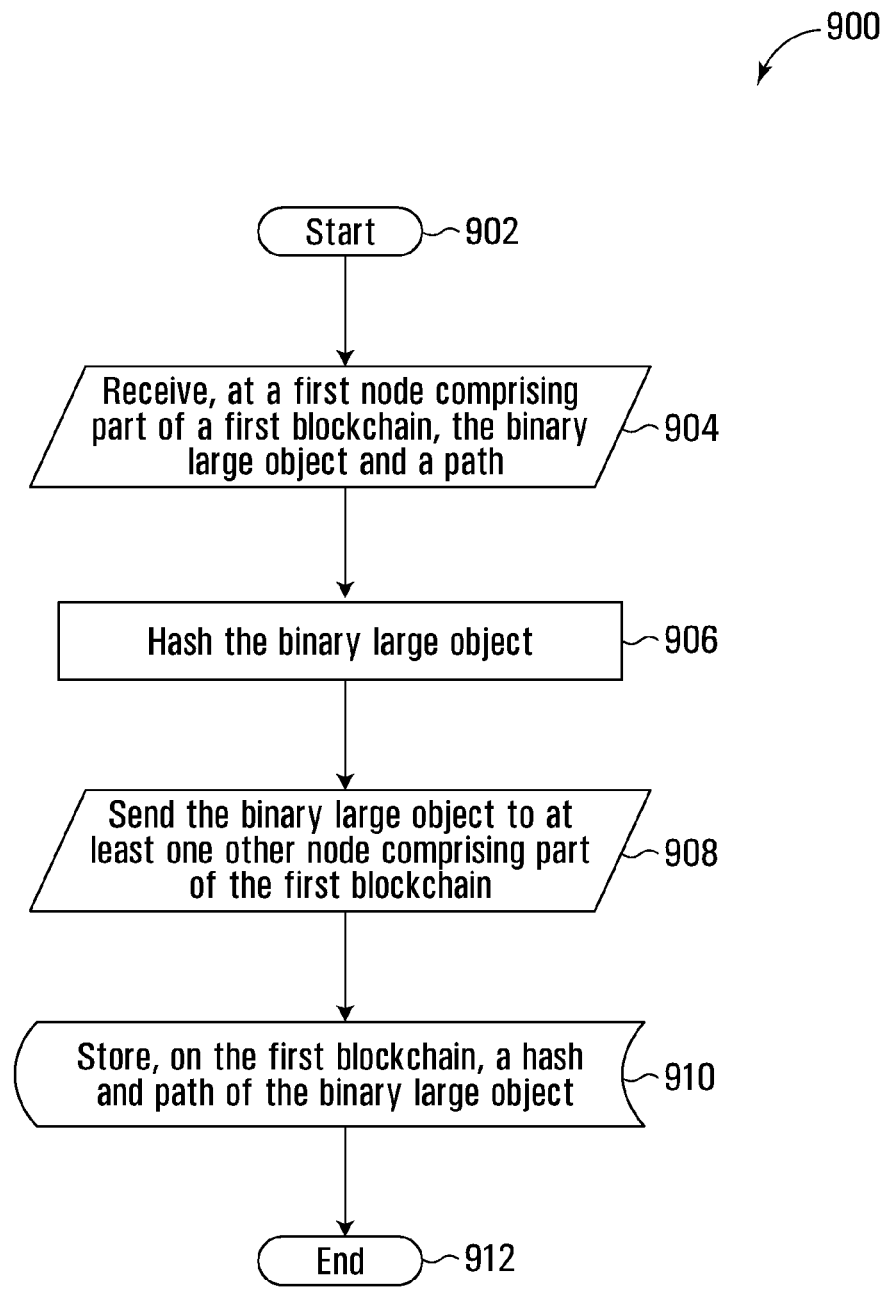
FIG. 9 depicts a method for storing a binary large object, according to another example embodiment.
Figure 10:
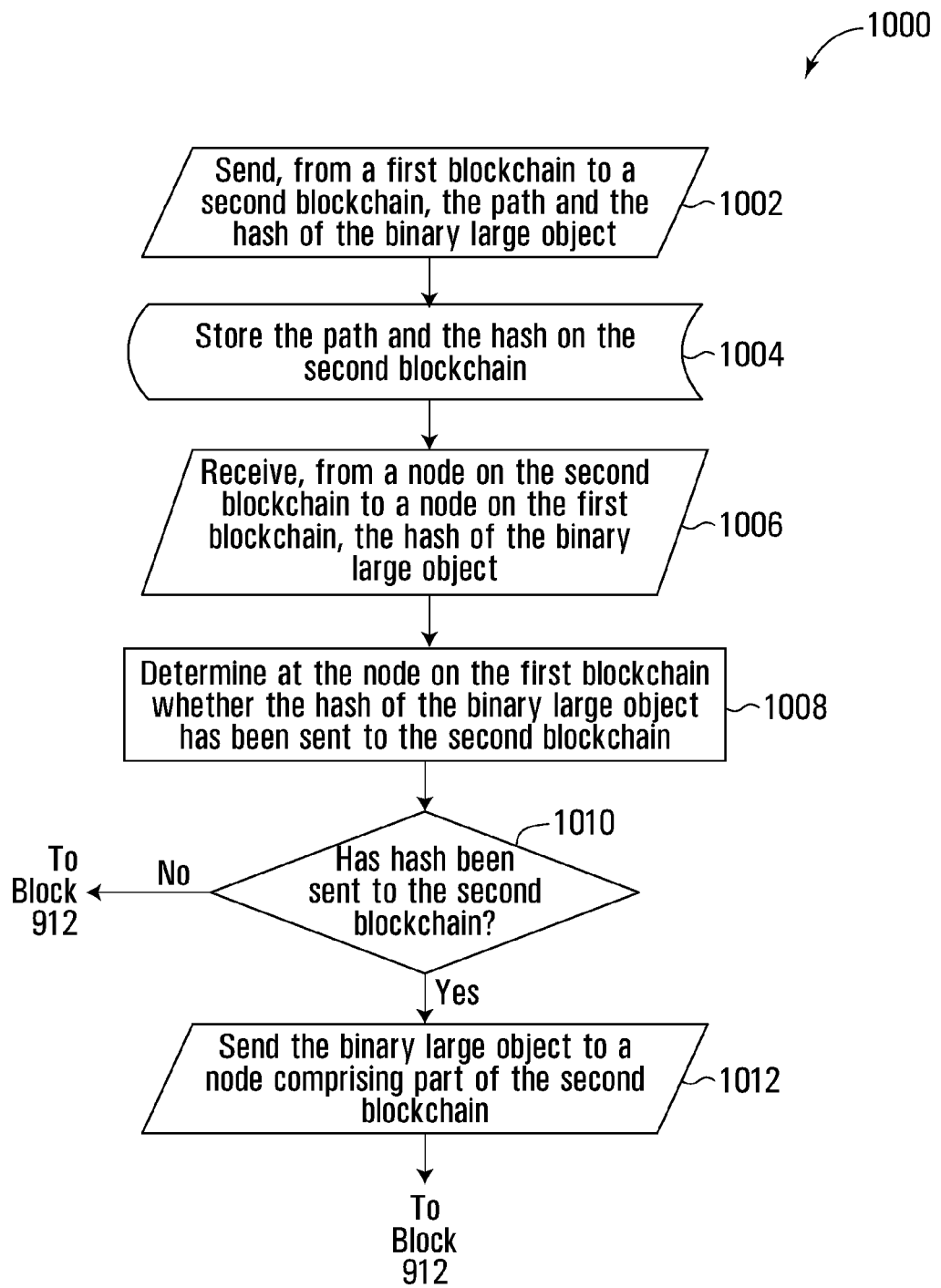
FIG. 10 depicts a method for sending a binary large object from a node comprising part of a first blockchain to a node comprising part of a second blockchain, according to another example embodiment.

Referring now to FIGS. 9 and 10, there are depicted a method 900 for storing a blob and a method 1000 for sending a blob from a node comprising part of a first blockchain to a node comprising part of a second blockchain, according to additional example embodiments. In FIGS. 9 and 10, the first blockchain 102a and the second blockchain 102*b* are used as example blockchains, and the first node 104*a* comprising part of the first blockchain 102*a* and the fifth node 104*e* comprising part of the second blockchain 102*b* are used as example nodes. However, in different example embodiments, blockchains and nodes other than these may be used to implement the methods 900,1000 of FIGS. 9 and 10. Each of the methods 900,1000 may be expressed as computer program code and stored on a non-transitory computer readable medium, such as the non-volatile storage 112, for execution by a node's 104 processor 106. More particularly, in at least some example embodiments one or both of the computer program code itself or references to the computer program code may be stored on the blockchain 102, and a reference to the existing blockchain 102 performing an action results from the processor 106 executing at least a portion of that computer program code. Code stored using or referenced by a block comprising part of the blockchain may be used to control the payload layer.

Referring now to FIG. 9, the method 900 begins at block 902 and proceeds to block 904 where the payload layer of the first node 104*a* receives the blob and a path of the blob from, for example, a user of the system 100 who is uploading the blob and specifying the path. The path may be in any suitable format, such as a directory graph or directory tree structure. An example path in directory tree format comprises the directory and filename of the blob, such as "Drive:
\directory_level1\directory_level2\blob_filename.blob".
The first node 104*a* may receive the path after it has received the entirety of the blob; alternatively, the first node 104*a* may receive the path while it is receiving the blob, or before it begins receiving the blob. As the payload layer receives the blob, it stores the blob in one or both of the non-volatile storage 112 and RAM 110 at the path and associates the blob with a "temporary flag" until the blob is validated as discussed below.

Once the first node 104*a* has received the blob and path at block 904, the first node 104*a* hashes the blob at block 906. Following hashing the blob, the first node at block 908 104*a* causes the blob to be disseminated to at least a number of nodes 104*b-d* comprising part of the first blockchain 102*a* required to achieve consensus. This is done by using the payload layer and without using the first blockchain 102*a*; for example, the first node's 102*a* payload layer may send the blob to the payload layer on each of the other nodes 104*b-d*. This may be done using any suitable peer-to-peer file transfer protocol, such as BitTorrent™. Each of the nodes 104*b-d* that receives the blob via its payload layer determines the hash of the blob once it has received the entire blob. As the payload layer of each of the second through fourth nodes 104*b-d* receives the blob at block 908, it stores the blob in one or both of the non-volatile storage 112 and RAM 110 at the path and associates the blob with a "temporary" flag until it is able to validate the blob as discussed below.

After the nodes 104*b-d* have received the blob via their payload layers and have each independently determined the blob's hash, the method 900 proceeds to block 910 and the nodes 104*a-d* attempt to store, on the first blockchain 102*a*, the hash and path of the blob. At block 910, each of the nodes 104*b-d* receives from the first node 104*a* the path and hash of the blob as obtained by the first node 104*a*. The first node 104*a* sends this data to the second through fourth nodes 104*b-d* using the first blockchain 102*a* by proposing that the path and hash be subjected to consensus. From the perspective of each of the second through fourth nodes 104*b-d*, the hash and path received from the first blockchain 102*a* are only a proposed hash and a proposed path, respectively, until they have been validated by each of the nodes 104*b-d*. To validate the proposed hash, each of the nodes 104*b-d* determines a hash of the blob that was disseminated to it at block 908, determines whether the proposed hash is equivalent to that independently determined hash, and only votes to store the proposed hash on the first blockchain as the actual hash of the blob if the proposed hash it receives from the first node 104*a* is equivalent to the hash it independently determined. Each of the nodes 104*b-d* also changes the blob's flag from "temporary" to "non-temporary" or "permanent" if the proposed and independently determined hashes match.

Similarly, each of the nodes 104*b-d* independently validates the proposed path it receives from the first node 104*a*. Each of the nodes 104*b-d* may apply any suitable validation method; for example, a node 104*b-d* may require the path to exclude certain characters or be of a certain length to be valid.

If a node 104*b-d* validates the proposed hash and the proposed path, it votes to add the proposed hash and proposed path, respectively, to the first blockchain 102*a* during the consensus process. While in this particular example embodiment the first node 104*a* sends the hash and the path to the other nodes 104*b-d*, in different example embodiments (not depicted) only the hash may be sent and a path may be presumed without being specified. For example, all of the nodes 104*a-d* may be default store the blobs in a pre-configured directory, such as a downloads directory.

If enough of the nodes 104*a-d* vote in favor of consensus, a new block comprising the blob's hash and path is added to the blockchain 102*a* at block 910.

The method 900 subsequently ends at block 912.

Once the blob has been transferred to all the other nodes 104*b-d* of the blockchain 102*a* and the blockchain 102*a* has stored on it the blob hash and path, any node 104*a-d* on the blockchain 102*a* is able to access the blob's path by accessing the appropriate block on the blockchain 102*a*. The path points to the blob, which is stored off the blockchain 102*a*, thereby permitting access to the blob via the blockchain 102*a* without storing the blob itself on the blockchain 102*a*. Further, as the blob hash is stored on the blockchain 102*a* and each of the nodes 104*a-d* stores the blob in its payload layer, any one of the nodes 104*a-d* is able to access the entire blob, determine its hash, and compare that hash to the blob hash stored on the blockchain 102*a*. This permits any of the nodes 104*a-d* to verify the authenticity of the blob notwithstanding that the blob itself is not stored on the blockchain 102*a*.

The blob may be shared from the first blockchain 102*a* to the second blockchain 102*b* using the method 1000 of FIG. 10, which employs chain joining. At block 1002 in FIG. 10, the first blockchain 102*a* sends to the second blockchain 102*b* the path and hash of the blob that is stored on the first blockchain 102*a* at block 910. Chain joining is used to do this, with the first blockchain 102*a* acting as the provider chain of FIG. 5A and the second blockchain 102*b* acting as the consumer chain of FIG. 5A. While FIG. 10 shows a single blob hash and path being sent from the first blockchain 102*a* to the second blockchain 102*b*, in at least some example embodiments (not depicted) paths and hashes for multiple blobs may be sent from the first blockchain 102*a* to the second blockchain 102*b*. A block on the second blockchain 102*b* may be used to store a path and hash only for a single blob, or may be used to store paths and hashes for many blobs. As part of the chain joining process, the path and the hash are stored in a new block on the second blockchain 102b at block 1004.

One of the nodes comprising part of the second blockchain 102b, which in this example embodiment is the fifth node 104e, then selects one of the hashes stored on the second blockchain 102b and that it has received from the first blockchain 102a, which corresponds to the blob that the fifth node 104e desires to access. At block 1006, the fifth node 104e sends this hash to a node comprising part of the first blockchain 102a, which in this example embodiment is the first node 104a. Communication between the first and fifth nodes 104a,e at block 1006 is done using the payload layer on each of the nodes 104a,e; that is, without using chain joining or the blockchains 102a,e. At blocks 1008 and 1010, the first node 104a determines whether the first blockchain 102a sent the hash the first node 104a received from the fifth node 104e prior to the first node 104a receiving it from the fifth node 104e. If no, the method 1000 ends. If yes, the method 1000 proceeds to block 1012 and the payload layer on the first node 104a of the first blockchain 102a sends the blob corresponding to the hash the fifth node 104e sent to the first node 104a. Chain joining is not used to send the blob; rather, the payload layers of the first and fifth nodes 104a,e are used as described above. Once the blob has been transferred to the fifth node 104e, the method 1000 ends.

Once the fifth node 104e receives the blob, it stores the blob in one or both of the non-volatile storage 112 and RAM 112 at the path and sends the blob to the other nodes 104f-h comprising the second blockchain 102b in a manner analogous to how the first node 104a propagates the blob to the other nodes 104b-d comprising part of the first blockchain 102a at block 906.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or portion of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is for the purpose of describing particular embodiments only and is not intended to be limiting. Accordingly, as used herein, the singular forms "a", "an", and "the" are intended to include the plural forms as well, unless the context clearly indicates otherwise. It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

It is contemplated that any part of any aspect or embodiment discussed in this specification can be implemented or combined with any part of any other aspect or embodiment discussed in this specification.

In construing the claims, it is to be understood that the use of computer equipment, such as a processor, to implement the embodiments described herein is essential at least where the presence or use of that computer equipment is positively recited in the claims. It is also to be understood that implementing a blockchain inherently requires computer equipment, such as a processor for creating and authenticating new blocks, storage for storing the blockchain, and a network interface for allowing communication between nodes, which is required for consensus.

One or more example embodiments have been described by way of illustration only. This description is been presented for purposes of illustration and description, but is not intended to be exhaustive or limited to the form disclosed. It will be apparent to persons skilled in the art that a number of variations and modifications can be made without departing from the scope of the claims.

The invention claimed is:

1. A method for storing a binary large object, the method comprising:
    (a) receiving, at a first node comprising part of a first blockchain, the binary large object;
    (b) hashing the binary large object;
    (c) sending the binary large object from the first node to at least one other node comprising part of the first blockchain without using the first blockchain, wherein the sending comprises part of disseminating the binary large object to at least a number of nodes on the first blockchain required to achieve consensus; and
    (d) after the binary large object has been disseminated to at least the number of nodes on the first blockchain required to achieve consensus, storing a hash of the binary large object on the first blockchain.

2. The method of claim 1, wherein storing the hash of the binary large object on the first blockchain comprises, at each of the at least a number of nodes on the first blockchain required to achieve consensus:
    (a) receiving a proposed hash of the binary large object;
    (b) determining a hash of the binary large object that has been disseminated to the node;
    (c) determining that the proposed hash is equivalent to the hash of the binary large object that has been disseminated to the node; and (d) voting to store the proposed hash on the first blockchain.

3. The method of claim 2, further comprising, at each of the at least a number of nodes on the first blockchain required to achieve consensus:
(a) flagging the binary large object that has been disseminated to the node as a temporary file; and
(b) flagging the binary large object that has been disseminated to the node as a temporary file as a non-temporary file.

4. The method claim 1, further comprising:
(a) receiving, at the first node, a path of the binary large object; and
(b) after the binary large object has been disseminated to at least the number of nodes on the first blockchain required to achieve consensus, storing the path of the binary large object on the first blockchain.

5. The method of claim 4, further comprising, prior to storing the path on the first blockchain, at each of the at least a number of nodes on the first blockchain required to achieve consensus:
(a) receiving a proposed path of the binary large object;
(b) determining that the proposed path is valid; and
(c) voting to store the proposed path on the first blockchain.

6. The method claim 1, further comprising:
(a) sending, from the first blockchain to a second blockchain, the hash of the binary large object;
(b) storing the hash of the binary large object on the second blockchain;
(c) receiving, at a first node comprising part of the first blockchain from a second node comprising part of the second blockchain, the hash of the binary large object without using the first or the second blockchain;
(d) after receiving the hash of the binary large object, determining that the hash of the binary large object has been sent to the second blockchain; and
(e) sending the binary large object to the second node from the first node without using the first or the second blockchain.

7. The method of claim 6, wherein sending, from the first blockchain to the second blockchain, the hash of the binary large object comprises sending, from the first blockchain to the second blockchain:
(a) lineage verification data that permits the second blockchain to verify a lineage of at least one block of the first blockchain;
(b) a proper subset of all non-header data stored using the at least one block, wherein the proper subset of all non-header data comprises the hash of the binary large object; and
(c) validity verification data that permits the second blockchain to verify validity of the proper subset of all non-header data sent to the second blockchain from the first blockchain.

8. A method for storing a binary large object, the method comprising:
(a) receiving, at a second node from a first node, a binary large object, wherein each of the first and second nodes comprise part of a first blockchain and the binary large object is received at the second node without using the first blockchain;
(b) after receiving an entirety of the binary large object, determining a hash of the binary large object that was received at the second node from the first node;
(c) receiving a proposed hash of the binary large object;
(d) determining that the proposed hash is equivalent to the hash of the binary large object that was received at the second node from the first node; and
(e) voting to store the proposed hash on the first blockchain.

9. The method of claim 8, further comprising:
(a) flagging the binary large object that has been disseminated to the node as a temporary file; and
(b) flagging the binary large object that has been disseminated to the node as a temporary file as a non-temporary file.

10. The method of claim 8, further comprising:
(a) receiving a proposed path of the binary large object;
(b) determining that the proposed path is valid; and
(c) voting to store the proposed path on the first blockchain.

11. The method of claim 8, further comprising:
(a) receiving, at a second blockchain comprising the second node from a first blockchain comprising the first node, the hash of the binary large object;
(b) storing the hash of the binary large object on the second blockchain;
(c) sending, from the second node to the first node, the hash of the binary large object without using the first or the second blockchain; and
(d) receiving, from the first node to the second node, the binary large object without using the first or the second blockchain.

12. The method of claim 11, wherein receiving, at the second blockchain from the first blockchain, the hash of the binary large object comprises:
(a) receiving, at the second blockchain from the first blockchain:
(i) lineage verification data that permits the existing blockchain to verify a lineage of at least one block of the first blockchain;
(ii) a proper subset of all non-header data stored using the at least one block, wherein the proper subset of all non-header data comprises the hash of the binary large object; and
(iii) validity verification data that permits the second blockchain to verify validity of the proper subset of all non-header data sent to the second blockchain from the first blockchain;
(b) verifying lineage of the at least one block of the first blockchain using the lineage verification data;
(c) verifying validity of the proper subset of all non-header data using the validity verification data; and
(d) adding a new block to the second blockchain, wherein the new block is used to store the lineage verification data, the proper subset of all non-header data, and the validity verification data received from the first blockchain.

13. A system for storing a binary large object, the system comprising:
(a) network interface hardware for interfacing with another node comprising part of a first blockchain;
(b) a data store having stored on it the first blockchain and for storing the binary large object;
(c) a processor communicatively coupled to the data store and network interface hardware; and
(d) a memory communicatively coupled to the processor and having stored on it computer program code that is executable by the processor and that when executed by the processor causes the processor to perform a method comprising:

(i) receiving, at a first node comprising part of the first blockchain, the binary large object;
(ii) hashing the binary large object;
(iii) sending the binary large object from the first node to at least one other node comprising part of the first blockchain without using the first blockchain, wherein the sending comprises part of disseminating the binary large object to at least a number of nodes on the first blockchain required to achieve consensus; and
(iv) after the binary large object has been disseminated to at least the number of nodes on the first blockchain required to achieve consensus, storing a hash of the binary large object on the first blockchain.

14. A system for storing a binary large object, the system comprising:
(a) network interface hardware for interfacing with another node comprising part of a first blockchain;
(b) a data store having stored on it the first blockchain and for storing the binary large object;
(c) a processor communicatively coupled to the data store and network interface hardware; and
(d) a memory communicatively coupled to the processor and having stored on it computer program code that is executable by the processor and that when executed by the processor causes the processor to perform a method comprising:
(i) receiving, at a second node from a first node, a binary large object, wherein each of the first and second nodes comprise part of the first blockchain and the binary large object is received at the second node without using the first blockchain;
(ii) after receiving an entirety of the binary large object, determining a hash of the binary large object that was received at the second node from the first node;
(iii) receiving a proposed hash of the binary large object;
(iv) determining that the proposed hash is equivalent to the hash of the binary large object that was received at the second node from the first node; and
(v) voting to store the proposed hash on the first blockchain.

\* \* \* \* \*